US009305478B2

(12) United States Patent
Park et al.

(10) Patent No.: US 9,305,478 B2
(45) Date of Patent: Apr. 5, 2016

(54) ORGANIC LIGHT EMITTING DIODE DISPLAY DEVICE

(75) Inventors: Dong-Wook Park, Yongin (KR); Ki-Nyeng Kang, Yongin (KR); Deok-Young Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 808 days.

(21) Appl. No.: 13/397,563

(22) Filed: Feb. 15, 2012

(65) Prior Publication Data

US 2012/0293496 A1 Nov. 22, 2012

(30) Foreign Application Priority Data

May 20, 2011 (KR) ........................ 10-2011-0048159

(51) Int. Cl.
*G09G 3/00* (2006.01)
*G09G 3/32* (2006.01)
*H04N 13/04* (2006.01)

(52) U.S. Cl.
CPC .............. *G09G 3/003* (2013.01); *G09G 3/3233* (2013.01); *G09G 2300/0819* (2013.01); *G09G 2300/0852* (2013.01); *G09G 2300/0861* (2013.01); *G09G 2310/0218* (2013.01); *G09G 2320/0261* (2013.01); *H04N 13/0438* (2013.01)

(58) Field of Classification Search
CPC ................ G09G 3/003; G09G 3/3233; G09G 2320/0261; G09G 2300/0852; G09G 2300/0866; G09G 2310/0218; G09G 2300/0819; H04N 13/0438
USPC ............. 345/1.1–1.3, 54, 76, 77, 79, 82, 209, 345/211, 212, 419
See application file for complete search history.

(56) References Cited

U.S. PATENT DOCUMENTS

| | | | | |
|---|---|---|---|---|
| 2003/0168992 | A1* | 9/2003 | Noguchi et al. | 315/169.3 |
| 2005/0110718 | A1* | 5/2005 | Lee et al. | 345/76 |
| 2005/0110723 | A1* | 5/2005 | Shin | 345/76 |
| 2008/0299713 | A1* | 12/2008 | Kim | 438/166 |
| 2009/0309816 | A1* | 12/2009 | Choi | 345/76 |
| 2010/0156874 | A1* | 6/2010 | Jung et al. | 345/211 |
| 2011/0018983 | A1* | 1/2011 | Kim et al. | 348/56 |
| 2011/0254818 | A1* | 10/2011 | Fang et al. | 345/205 |

FOREIGN PATENT DOCUMENTS

| | | | |
|---|---|---|---|
| KR | 10-2006-0053693 | A | 5/2006 |
| KR | 10-2008-0014331 | A | 2/2008 |
| KR | 10-2011-0013693 | A | 2/2011 |

* cited by examiner

*Primary Examiner* — Premal Patel
(74) *Attorney, Agent, or Firm* — Lewis Roca Rothgerber Christie LLP

(57) ABSTRACT

An OLED display device includes first and second group pixels that emit light during first and second fields, respectively; first and second scan lines respectively coupled to the first and second group pixels; and first and second power lines for respectively supplying first and second power voltages to the first and second group pixels. The first and second power lines are coupled with first electrodes of the respective storage capacitors of the first and second group pixels, and the first power voltage is supplied as a first level voltage for a first period during which the first group pixels concurrently emit light. The first and second power lines are coupled with first electrodes of the respective storage capacitors of the first and second group pixels, and the first power voltage is supplied as a first level voltage for a first period during which the first group pixels concurrently emit light.

53 Claims, 20 Drawing Sheets

1x1 Dot Weave

1x2 Dot Weave

| E | E | O | O | E | E | O | O |
|---|---|---|---|---|---|---|---|
| O | O | E | E | O | O | E | E |
| E | E | O | O | E | E | O | O |
| O | O | E | E | O | O | E | E |
| E | E | O | O | E | E | O | O |
| O | O | E | E | O | O | E | E |

2x1 Dot Weave

| E | O | E | O | E | O | E | O |
|---|---|---|---|---|---|---|---|
| E | O | E | O | E | O | E | O |
| O | E | O | E | O | E | O | E |
| O | E | O | E | O | E | O | E |
| E | O | E | O | E | O | E | O |
| E | O | E | O | E | O | E | O |

ORGANIC LIGHT EMITTING DIODE DISPLAY DEVICE

CROSS-REFERENCE TO RELATED APPLICATION

This application claims priority to and the benefit of Application No. 10-2011-0048159 filed in the Korean Intellectual Property Office on May 20, 2011, the entire content of which is incorporated herein by reference.

BACKGROUND

1. Field

The present invention relates to an organic light emitting diode (OLED) display device. More particularly, the present invention relates to an active matrix (AM) type display device and a display panel included therein.

2. Description of Related Art

In recent years, various flat panel displays having reduced weight and volume in comparison to cathode ray tubes have been developed. The flat panel displays include a liquid crystal display (LCD), a field emission display (FED), a plasma display panel (PDP), and an organic light emitting diode (OLED) display device.

Among the flat panel displays, the organic light emitting diode (OLED) display device, which displays an image by using organic light emitting diodes that generate light by recombination of electrons and holes, is driven at low power consumption while having a rapid response speed and has excellent emission efficiency, luminance, and viewing angle.

Typically, the organic light emitting diode display device is classified into a passive matrix organic light emitting diode (PMOLED) display device and an active matrix organic light emitting diode (AMOLED) display device according to a driving method of organic light emitting diodes.

In the passive matrix type, anode electrode lines and cathode electrode lines are formed crossing each other and a cathode electrode line and an anode electrode line are selected to be driven. In the active matrix type, a thin film transistor and a capacitor are integrated in each pixel to maintain a voltage by the capacitance of the capacitor. The passive matrix type has a simple structure, thus the cost thereof is low; however, the passive matrix type is not suitable for fabricating large sized or high resolution panels. On the other hand, the active matrix type enables the fabrication of large-sized and high resolution panels. However, its control method is technically more complicated and its cost is relatively high.

In view of resolution, contrast, and operation speed, the active matrix organic light emitting diode (AMOLED) display device which selectively lights every unit pixel has been widely used.

The AMOLED display device includes a display panel having a plurality of transistors, a capacitor, a scan line, a data line, and at least one power line for driving an organic light emitting diode in each pixel arranged in a matrix format and a driving device for driving the display panel.

Such an OLED display device requires high integration and high precision to realize a 3-dimensional stereoscopic image in a large-sized display panel, and accordingly a design of a display panel that can be applied to various driving methods with simple alignment is desired.

In particular, an OLED display device for displaying a stereoscopic image should alternately display first view point images and second view point images during one second, and accordingly a driving frequency should be two or more times higher compared to realization of a plane image.

For this purpose, a scan period for programming image data at each view point and a light emission period for light emission according to the programmed image data should be included in one frame, and a driver operating with a high driving frequency for scanning the entire display panel during the scan period and programming image data, is typically used. The driver having a high driving frequency may cause increase of production cost.

Moreover, as the display panel is increased in size and resolution, an RC delay of the display panel is increased so that the image data programming may not be efficiently performed.

Therefore, an OLED display device that can display a plane image or a stereoscope image without increasing a driving frequency within a given size of the display panel and a design of a display panel for driving of the same are desired.

The above information disclosed in this Background section is only for enhancement of understanding of the background of the invention and therefore it may contain information that does not form the prior art that is already known in this country to a person of ordinary skill in the art.

SUMMARY

According to embodiments of the present invention, an OLED display device is designed to be driven to display a plane image or a stereoscope image without increasing a driving frequency.

An OLED display device according to an exemplary embodiment of the present invention includes: a plurality of pixels including first group pixels configured to concurrently emit light during a first field, and second group pixels configured to concurrently emit light during a second field that is different from the first field; a plurality of first scan lines and a plurality of second scan lines respectively coupled to the first group pixels and the second group pixels; and a plurality of first power lines for supplying a first power voltage to each of the first group pixels and a plurality of second power lines for supplying a second power voltage to each of the second group pixels. The plurality of first power lines and the plurality of second power lines are coupled with first electrodes of respective storage capacitors of the first and second group pixels, and the first power voltage is supplied as a first level voltage for a first period during which the first group pixels concurrently emit light. The second power voltage is supplied as a second level voltage for a second period that is different from the first period during which the second group pixels concurrently emit light.

The first level voltage and the second level voltage may have the same level, but the present invention is not limited thereto.

The first level voltage and the second level voltage may be different from a level of the first power voltage and a level of the second power voltage for a scan period during which a plurality of scan signals are transmitted through the plurality of first scan lines and the plurality of second scan lines.

An extension direction of the plurality of first and second power lines, and a connection direction of the first electrodes of the storage capacitors, are perpendicular to each other.

The plurality of first power lines and the plurality of second power lines may be alternately arranged in a row direction or a column direction of the plurality of pixels, but it is not restrictive.

The respective first group pixels and the respective second group pixels include at least one power connection wire coupled to the first electrodes of the storage capacitors and configured to respectively transmit the first power voltage and the second power voltage supplied to the first electrodes of the storage capacitors.

The respective first group pixels and the respective second group pixels include at least one data line crossing the plurality of first scan lines and the plurality of second scan lines, and configured to transmit image data signals to the respective first group pixels and the respective second group pixels.

As a stereoscopic image data signal, the image data signal may be a left-eye image data signal or a right-eye image data signal. Then, the first group pixels and the second group pixels may concurrently emit light during a first period and a second period for a period during which a left-eye image is displayed according to a left-eye image data signal in one frame period. Sequentially, the first group pixels and the second group pixels may concurrently emit light during a 1-1 period and a 2-1 period for a period during which a right-eye image is displayed according to a right-eye image data signal in one frame period.

The at least one data line includes data lines that may be respectively spaced from and may be parallel to the plurality of first power lines and the plurality of second power lines, but the present invention is not limited thereto.

The plurality of first scan lines and the plurality of second scan lines may be alternately arranged in a row direction or a column direction of the plurality of pixels, but the present invention is not limited thereto.

The OLED display device may further include: a plurality of first compensation lines and a plurality of second compensation lines for respectively transmitting a first compensation control signal and a second compensation control signal that control operation performed for compensating a driving transistor threshold voltage of each of the first and second group pixels; and a plurality of first compensation control connection lines and a plurality of second compensation control connection lines coupled to the respective first and second group pixels and for transmitting the first compensation control signal and the second compensation control signal transmitted through the plurality of first compensation lines and the plurality of second compensation lines to the first group pixels and the second group pixels.

A period for compensating the driving transistor threshold voltage may be prior to a scan period during which a plurality of scan signals are transmitted through the plurality of first scan lines and the plurality of second scan lines of the OLED display device.

The plurality of first compensation lines and the plurality of second compensation lines may be respectively spaced from and may be in parallel to a plurality of first power lines and a plurality of second power lines of the OLED display device, but the present invention is not limited thereto.

The plurality of first compensation lines and the plurality of second compensation lines may respectively cross the plurality of first scan lines and the plurality of second scan lines of the OLED display device, but the present invention is not limited thereto.

A direction in which the plurality of first compensation lines and the plurality of second compensation lines extend, and a direction in which the plurality of first compensation control connection lines and the plurality of second compensation control lines extend, may be perpendicular to each other.

The plurality of first compensation lines and the plurality of second compensation lines may be alternately formed along a row direction or a column direction of the plurality of pixels, but the present invention is not limited thereto.

Each of the first group pixels and each of the second group pixels respectively may include at least one sub-pixel including an emission unit comprising an organic light emitting diode and a circuit unit for supplying a driving current according to an image data signal to the emission unit. The at least one sub-pixel may include one or more of sub-pixels R, G, and B. First electrodes of storage capacitors of the respective sub-pixels may be coupled with each other. In addition, since a power connection wire coupling a first electrode of a storage capacitor of a sub-pixel and a driving source electrode to each other, may be coupled with a first electrode of a storage capacitor of a sub-pixel of another adjacent pixel, and accordingly first electrodes of storage capacitors of a plurality of pixels included in a pixel row may be coupled with each other.

The emission unit may be formed at a layer different from a layer where the circuit unit is formed.

The emission unit includes a first electrode layer coupled with the circuit unit, an organic emission layer, and a second electrode layer to which a third power voltage is applied.

The third power voltage may be a third level voltage for a third period that is prior to a scan period during which a plurality of scan signals are transmitted through the plurality of first scan lines and the plurality of second scan lines.

The third level voltage may be higher than a first power voltage level and a second power voltage level respectively supplied to the first group pixels and the second group pixels during the third period.

The circuit unit may include a driving transistor including a driving drain electrode coupled with the first electrode layer of the emission unit, a driving gate electrode, a driving active layer, and a driving source electrode.

The circuit unit may include a switching transistor including a switching gate electrode, a switching active layer, a switching source electrode, and a switching drain electrode.

The circuit unit may include a compensation transistor including a compensation gate electrode, a compensation active layer, a first compensation electrode, and a second compensation electrode.

In addition, the circuit unit may include a storage capacitor including a first electrode and a second electrode, and a compensation capacitor including a first compensation capacitor electrode and a second compensation capacitor electrode.

The first electrode of the storage capacitor may be coupled through at least one contact hole to a point crossed with the first power line or the second power line.

The first electrode of the storage capacitor may be coupled through at least one contact hole to a point overlapped with at least one power connection wire that transmits a first power voltage or a second power voltage supplied through the first power line or the second power line to the driving source electrode.

The switching gate electrode may be coupled to a first scan line or a second scan line, the switching source electrode may be coupled to a data line for transmitting an image data signal, and the compensation gate electrode may be coupled with a first compensation control connection line or a second compensation control connection line.

The circuit unit may further include: a power connection wire coupling the first electrode of the storage capacitor to the driving source electrode and for transmitting the first power voltage or the second power voltage transmitted to the first electrode of the storage capacitor to the driving source electrode; a first connection wire coupling the second electrode of the storage capacitor, the switching drain electrode, and the first compensation capacitor electrode; and a second connection wire coupling the second compensation capacitor electrode and the driving gate electrode.

The circuit unit may further include a connection portion coupling the first electrode layer of the emission unit and the driving drain electrode, and the first compensation electrode may be coupled to the connection portion.

The switching active layer, the switching source electrode, the switching drain electrode, the driving active layer, the driving source electrode, the driving drain electrode, the compensation active layer, the first compensation electrode, the second compensation electrode, the second electrode of the storage capacitor, and the first compensation capacitor electrode may be located at a first layer.

The switching gate electrode, the driving gate electrode, the compensation gate electrode, the first electrode of the storage capacitor, and the second compensation capacitor electrode may be located at same layer, and may be respectively disposed on the switching active layer, the driving active layer, the compensation active layer, the second electrode of the storage capacitor, and the first compensation capacitor electrode, with an insulating layer interposed therebetween.

A first scan line or a second scan line coupled to the switching gate electrode may be located at the second layer, and may be spaced from and between the first electrode of the storage capacitor and the second compensation capacitor electrode.

A first compensation control connection line or a second compensation control connection line coupled to the compensation gate electrode may be located at the second layer and may be spaced from and between the driving gate electrode and the second compensation capacitor electrode.

A data line for transmitting an image data signal, a first power line or a second power line for supplying a first power voltage or a second power voltage, a first compensation line or a second compensation line for transmitting a first compensation control signal or a second compensation control signal, a power connection wire for transmitting the first power voltage or the second power voltage, a first connection wire coupling the second electrode of the storage capacitor, the switching drain electrode, and the first compensation capacitor electrode, and a second connection wire coupling the second compensation capacitor electrode and the driving gate electrode may be located at the same layer above the second layer, with an insulating layer interposed therebetween.

The data line may have a contact hole in an area overlapped with the switching source electrode.

The first power line or the second power line may have a contact hole in an area overlapped with the first electrode of the storage capacitor.

The first compensation line or the second compensation line may have a contact hole in an area overlapped with a first compensation control connection line or a second compensation control connection line.

The power connection wire may have contact holes at areas respectively overlapped with the first electrode of the storage capacitor and the driving source electrode.

The first connection wire may have contact holes at areas respectively overlapped with the second electrode of the storage capacitor, the switching drain electrode, and the first compensation capacitor electrode.

The second connection wire includes contact holes in areas respectively overlapped with the second compensation capacitor electrode and the driving gate electrode.

The first group pixels may form a plurality of first pixel rows arranged in a first direction, the second group pixels may form a plurality of second pixel rows arranged in the first direction, and the first pixel rows and the second pixel rows may be alternately arranged.

Each of the first group pixels and each of the second group pixels may be alternately arranged in the first direction and a second direction that is perpendicular to the first direction.

In the first group pixels and the second group pixels that are alternately arranged in the first direction and adjacent to each other, a circuit unit is located at a first side or a second side opposite the first side of an emission unit in accordance with a location of the emission unit of each of the pixels.

Every two pixel rows of the first group pixels and the second group pixels alternately arranged in the first direction may share one first or second scan line.

Every two pixel columns of the first group pixels and the second group pixels alternately arranged in the first direction may share one first or second compensation line.

The first group pixels may form a plurality of first pixel areas arranged in a first direction, and a second direction that is perpendicular to the first direction with at least two pixels, the second group pixels may form a plurality of second pixel areas arranged in the first and second directions with at least two pixels, and the first pixel areas and the second pixel areas may be alternately arranged.

In the first pixel areas and the second pixel areas that are alternately arranged in the first direction and adjacent to each other, a circuit unit is located at a first side or a second side opposite the first side of an emission unit in each pixel area in accordance with a location of the emission unit.

Every two pixel rows of the first pixel areas and the second pixel areas that are alternately arranged in the first direction may share at least one first scan line or at least one second scan line.

Every two pixel columns of the first pixels areas and the second pixel areas that are alternately arranged in the first direction may share at least one first compensation line or at least one second compensation line.

The alignment of the pixels is not limited to the above-described embodiment.

An OLED display device according to another exemplary embodiment of the present invention includes: a plurality of pixels including first group pixels configured to concurrently emit light during a first field, and second group pixels configured to concurrently emit light during a second field that is different from the first field; a plurality of first scan lines and a plurality of second scan lines respectively coupled to the first group pixels and the second group pixels; a plurality of first compensation lines and a plurality of second compensation lines for respectively transmitting a first compensation control signal and a second compensation control signal that control operation of a compensating a driving transistor threshold voltage of each of the first and second group pixels; a plurality of first compensation control connection lines and a plurality of second compensation control connection lines respectively coupled to the plurality of first compensation lines and the plurality of second compensation lines and for respectively transmitting the first compensation control signal and the second compensation control signal to the first group pixels and the second group pixels; and a plurality of first power lines for supplying a first power voltage to respective ones of the first group pixels and a plurality of second power lines for supplying a second power voltage to respective ones of the second group pixels.

The first power voltage may be supplied as a first level voltage for a first period during which the first group pixels concurrently emit light, and the second power voltage is supplied as a second level voltage for a second period during which the second group pixels concurrently emit light, the second period being different from the first period. In addition, the first power voltage and the second power voltage may have a fourth level that is different from the first and second levels for fourth and fifth periods during which the driving transistor threshold voltage is compensated according to the first compensation control signal and the second compensation control signal of the first period, and the first compensation control signal and the second compensation control signal before the second period.

The fourth level may be lower than the first and second levels.

The plurality of first power lines and the plurality of second power lines may be coupled with first electrodes of storage capacitors of the plurality of first and second power lines, the first electrodes being connected with each other.

The first level voltage and the second level voltage may have the same level, but the present invention is not limited thereto.

The first level voltage and the second level voltage may be different from a voltage of the first power voltage and a voltage of the second power voltage for a scan period during which a plurality of scan signals are transmitted through the plurality of first scan lines and the plurality of second scan lines.

The first compensation control signal and the second compensation control signal may have a voltage level that turns on transistors of the plurality of pixels during the fourth and fifth periods.

All the scan signals transmitted through the plurality of first and second scan lines during the fourth and fifth periods may have a voltage level that turns on transistors of the plurality of pixels.

The first period may be overlapped with a scan period of the second group pixels during which the scan signals are sequentially transmitted to the second group pixels through the second scan lines, and the second period may be overlapped with a scan period of the first group pixels during which the scan signals are sequentially transmitted to the first group pixels through the first scan lines.

A third power voltage supplied to a second electrode layer of each emission unit of the first group pixels or the second group pixels may have a fifth level during the fourth period or a sixth period before the fifth period.

The fifth level voltage may be higher than the levels of the first and second power voltages respectively supplied to the first group pixels and the second group pixels during the third period, but it is not restrictive.

According to embodiments of the present invention, an OLED display device that can reduce motion artifact and assure light emission duration to be the maximum, and a display panel designed to be used in driving of the same are provided. For example, a display panel where pixel circuits are arranged to display a stereoscopic image without increasing frequency and design of the pixel circuits are provided. Accordingly, a large-sized display device having a large-sized display panel may be manufactured.

DETAILED DESCRIPTION OF THE EMBODIMENTS

Figure 1:
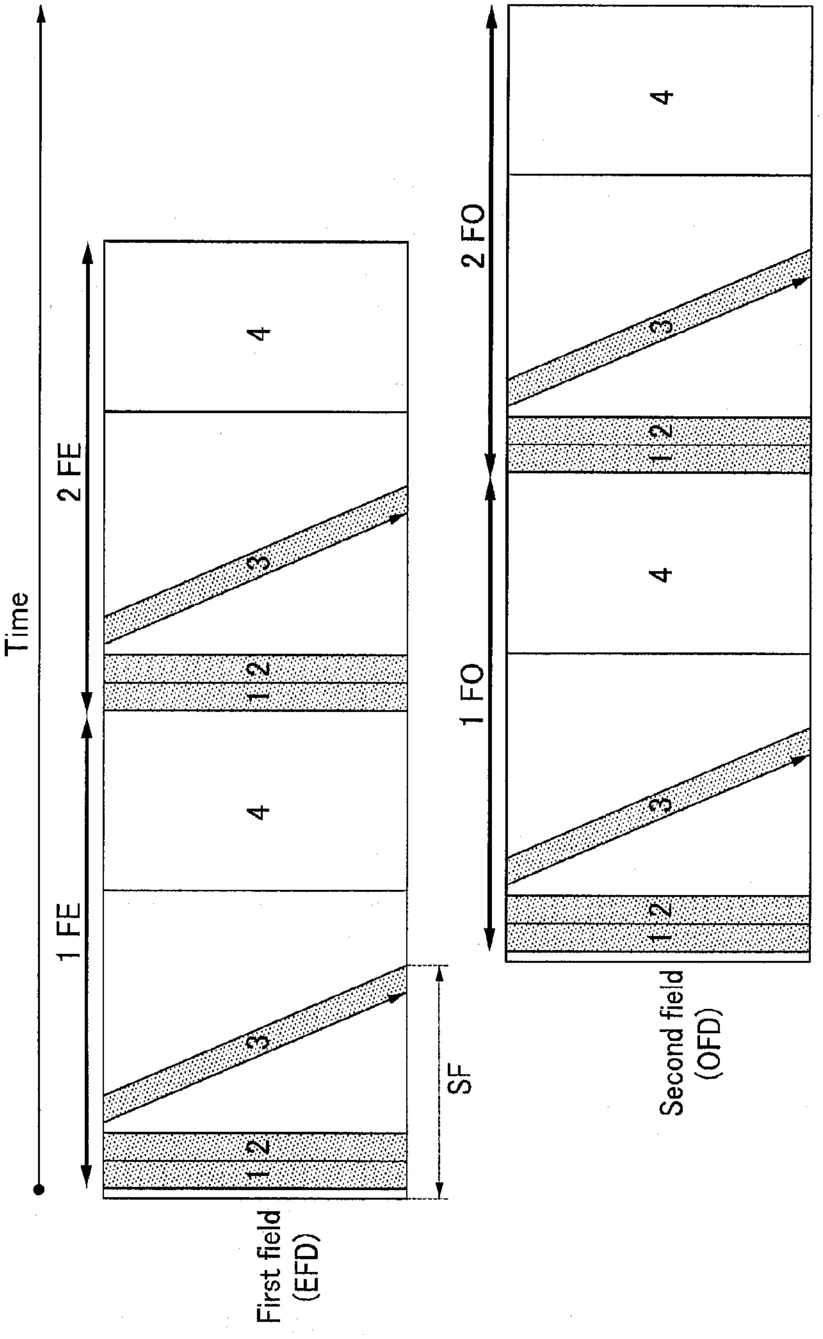
FIG. 1 shows a driving method of an organic light emitting diode (OLED) display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In various exemplary embodiments, the same reference numerals are used for elements having the same configuration and will be representatively described in a first exemplary embodiment, and in other exemplary embodiments, only elements different from those of the first exemplary embodiment will be described.

In order to clarify embodiments of the present invention, parts that are not related to a complete description and understanding of the invention may be omitted, and the same elements or equivalents are referred to by the same reference numerals throughout the specification.

Throughout this specification and the claims that follow, when it is described that an element is “connected” or “coupled” to another element, the element may be “directly coupled” to the other element or “electrically coupled” to the other element through a third element. In addition, unless explicitly described to the contrary, the word “comprise” and variations such as “comprises” or “comprising”, will be understood to imply the inclusion of stated elements, but not the exclusion of any other elements.

FIG. 1 shows a driving method of an organic light emitting diode (OLED) according to an exemplary embodiment of the present invention.

The driving method according to the exemplary embodiment of the present invention divides a plurality of first group pixels for emitting light in a first field and a plurality of second group pixels for emitting light in a second field among a plurality of pixels of an organic light emitting diode (OLED) display panel. The first and second fields are display periods including at least one frame, and the at least one frame sequentially includes a reset period 1, a compensation period 2, a scan period 3, and a light emission period 4.

In addition, the first field EFD and the second field OFD are synchronized at a time point delayed by a period (e.g., a predetermined period) SF and then driven. In a further detail, a frame 1FO of the second field that is temporally adjacent to a frame 1FE of the first field EFD is shifted by the period SF from the frame 1FE. The period SF is set to prevent a scan period 3 of the first field EFD and a scan period 3 of the second field OFD from being overlapped with each other. A frame 2FE of the first field EFD is continued from the frame 1FE, and a frame 2FO of the second field OFD is continued from the frame 1FO.

For a period 4 during which the first group pixels emit light, each of the second group pixels experiences a scan period 3 such that a corresponding data signal is programmed therein. Similarly, for a period during which the second group pixels emit light, each of the first group pixels experiences a scan period 3 such that a corresponding data signal is programmed therein. Thus, sufficient duration of the scan period 3 can be acquired, and accordingly a time margin for driving of the display panel is increased. Further, since a scan frequency can be decreased, a bandwidth of a data driver that generates a data signal and transmits the same to a data line and a bandwidth of a scan driver that generates a scan signal are decreased, thereby reducing cost of circuit parts.

Furthermore, light emission duration of the first group pixels and light emission duration of the second group pixels are separated so that the maximum amount of current required for the display device is decreased, thereby reducing cost of a power circuit that supplies power to the display device.

Unlike the driving method shown in FIG. 1, a driving method of another exemplary embodiment of the present invention may be a driving method that displays a stereoscopic image. That is, one frame may be formed of a first sub-frame for displaying a first view point image (e.g., left-eye image) and a second sub-frame for displaying a second view point image (e.g., right-eye image). When the driving method of the other exemplary embodiment is applied to the driving method of FIG. 1, the first group pixels display a left-eye image during a first sub-frame 1FE of the first field EFD and display a right-eye image during a second sub-frame 2FE of the first field EFD.

In addition, the first field EFD and the second field OFD are driven by being synchronized at a point of time shifted by the period (e.g., predetermined period) SF, and a first sub-frame 1FO of the second field OFD is started when being close to the start time of the first sub-frame 1FE of the first field EFD. That is, the first sub-frame of the second field OFD for displaying the first view point image (e.g., left-eye image) is started after being shifted by the period (e.g., predetermined period) SF.

Consecutive to the first sub-frame 1FO of the second field OFD, a second sub-frame 2FO for displaying the second view point image (e.g., right-eye image) is started.

The second sub-frame 2FO of the second field ODF is also temporally shifted by the period (e.g., predetermined period) SF from the start of the second sub-frame 2FE of the first field EFD.

Thus, when the OLED display device according to the present exemplary embodiment displays a stereoscopic image, the first group pixels display a left-eye image during the first sub-frame 1FE of the first field EFD, and the second group pixels display a left-eye image during the first sub-frame 1FO of the second field OFD, subsequently, the first group pixels display a right-eye image during the first sub-frame 1FO of the second field OFD, and then the second group pixels display a right-eye image during the second sub-frame 1FO of the second field OFD, as time elapses.

According to such a driving method of the present exemplary embodiment, a scan period 3 during which image data signals corresponding to other group pixels (second group pixels or first group pixels) are programmed, is generated for a light emission period 4 during which the first group pixels or the second group pixels display a left-eye image or a right-eye image, and therefore a driving time margin for realization of the 3-dimensional stereoscopic image is assured by assuring sufficient duration of the scan period 3.

FIGS. 2, 3A, 3B, 4A, and 4B show a first group pixel area and a second group pixel area that emit light in one field when the display panel is divided into two according to an exemplary embodiment of the present invention.

That is, when the display panel is divided into two, the first group pixel areas and the second group pixel areas that emit light in one field are shown together in FIGS. 2, 3A, 3B, 4A, and 4B.

In FIGS. 2, 3A, 3B, 4A, and 4B, a plurality of unit areas (hereinafter, referred to as first unit areas) forming an area (hereinafter, first area) where the first group pixels are arranged are respectively denoted as "E", and a plurality of unit areas (hereinafter, referred to as second unit areas) forming an area (hereinafter, referred to as a second area) where the second group pixels are arranged are respectively denoted as "O". Each unit area may be formed of at least one pixel, or may be formed of three sub-pixels R, G, and B.

Since the first unit area pixels E and the second unit area pixels O may respectively have a luminance difference, in one exemplary embodiment, each of the first unit area pixels E and each of the second unit area pixels O are arranged to be spatially adjacent to each other.

Figure 2:
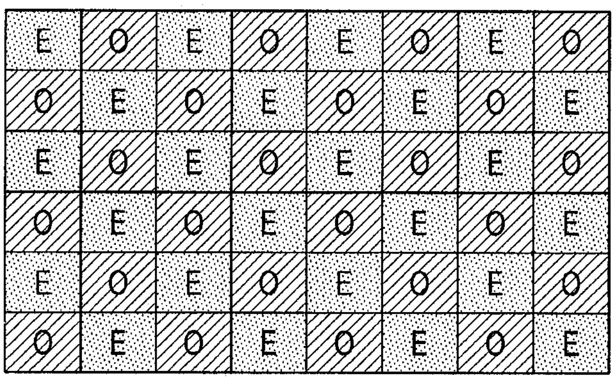
FIGS. 2, 3A, 3B, 4A, and 4B respectively show a first group pixel area and a second group pixel area that emit light in one field in the case that a display panel is divided into two areas according to an exemplary embodiment of the present invention.

In further detail, FIG. 2 shows a display panel where the plurality of first unit area pixels E and the plurality of second unit area pixels O are alternately arranged according to a 1×1 dot weave array. For better understanding and ease of description, the display panel is divided in a 6×8 matrix format, but the present invention is not limited thereto. The 1×1 dot weave array is a display alignment appropriate for progressive broadcasting or display. In addition, the first unit area pixels E and the second unit area pixels O are respectively adjacent to each other in vertical and horizontal directions so that luminance differences between the first unit area pixels E and the second unit area pixels O may be distributed.

Figure 3A:
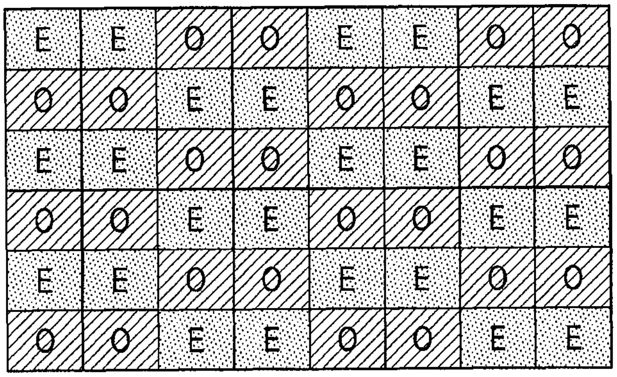
Figure 3B:
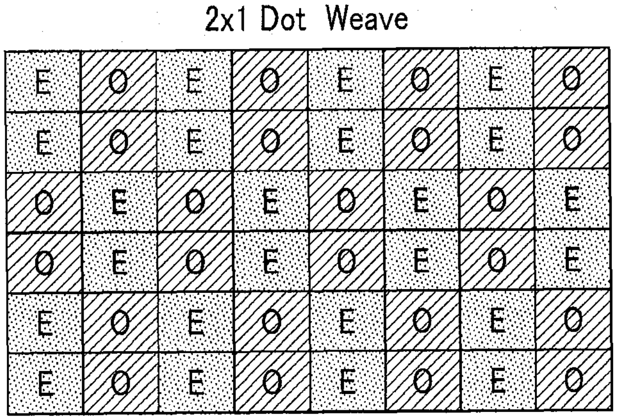

FIG. 3A and FIG. 3B show display panels where the plurality of first unit area pixels E and the plurality of second unit area pixels O are arranged according to the 1×2 dot weave array and the 2×1 dot weave array.

For better understanding and ease of description, the display panel is divided in a 6×8 matrix format, but the present invention is not limited thereto. The 1×2 dot weave array and the 2×1 dot weave array are appropriate to prevent a dithering pattern from standing out. A 2×2 dithering pattern is generally selected, and when an image is displayed in a display panel of the 1×1 dot weave array according to an image signal generated through the 2×2 dithering pattern, the 2×2 dithering pattern is highlighted or pronounced. The 1×2 dot weave array and the 2×1 dot weave array can prevent the 2×2 dithering pattern from being highlighted or pronounced.

According to the 1×2 dot pixel array of FIG. 3A, every two adjacent first unit area pixels E are adjacent to two first unit area pixels O in a vertical direction and one second unit area pixel O in a horizontal direction.

According to the 2×1 dot pixel array of FIG. 3B, every two adjacent first area pixels E are adjacent to one second unit area pixel O in the vertical direction and two unit area pixels O in the horizontal direction.

Figure 4A:
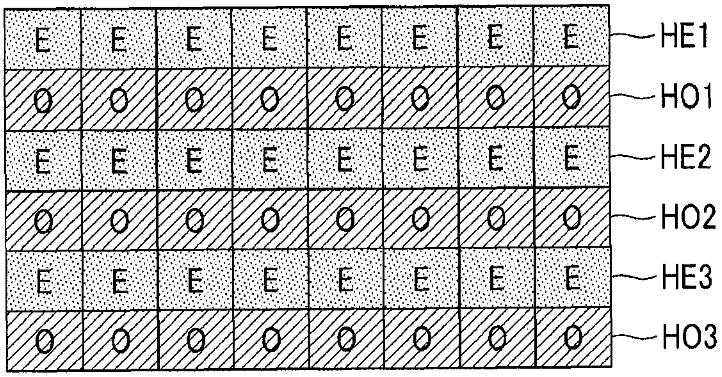
Figure 4B:
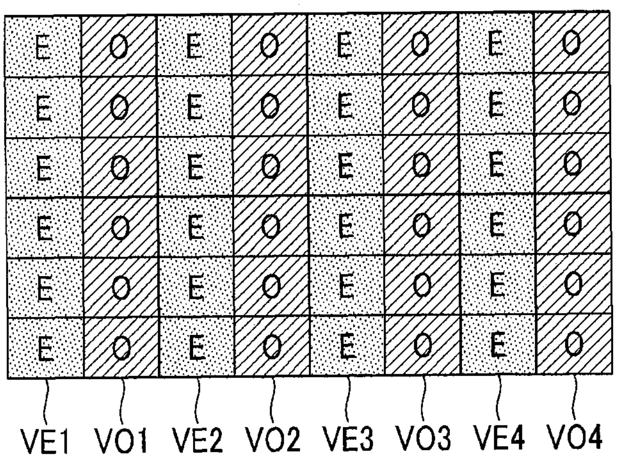

FIG. 4A and FIG. 4B show the display panel of which the plurality of first unit area pixels E and the plurality of second unit area pixels are alternately arranged forming a horizontal line or a vertical line according to a line by line array.

FIG. 4A shows a horizontal line array in which first horizontal lines HE1 to HE3 where the plurality of first unit area pixels E are arranged, and second horizontal lines HO1 to HO3 where the plurality of second unit area pixels are arranged, are alternately arranged along a vertical direction. For better understanding and ease of description, three of the first horizontal lines and three of the second horizontal lines are illustrated, but the present invention is not limited thereto. The horizontal line array is appropriate to express interlace broadcasting or display.

FIG. 4B shows a vertical line array method in which first vertical lines VE1 to VE4 in which a plurality of first unit area pixels E are arranged and second vertical lines VO1 to VO4 in which the plurality of second unit area pixels O are alternately arranged along a horizontal direction. For better understanding and ease of description, four of the first vertical lines and four of the second vertical lines are illustrated, but the present invention is not limited thereto. The vertical line array method is appropriate to realize an image (e.g., a moving image) having frequent horizontal movement.

Figure 5A:
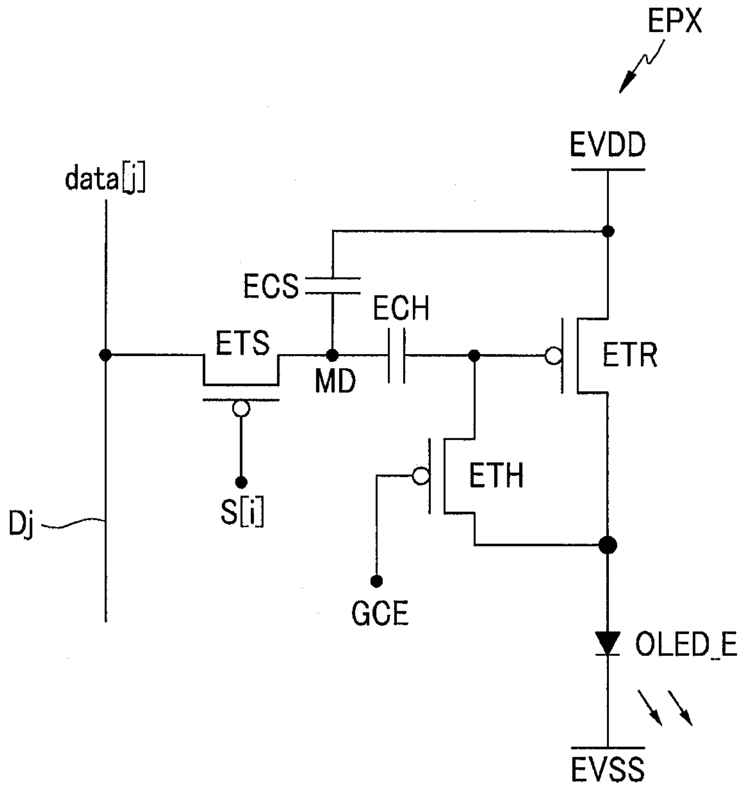
FIGS. 5A and 5B are circuit diagrams of a pixel structure corresponding to a first unit area pixel E and a second unit area pixel O among the first group pixels and the second group pixels.
Figure 5B:
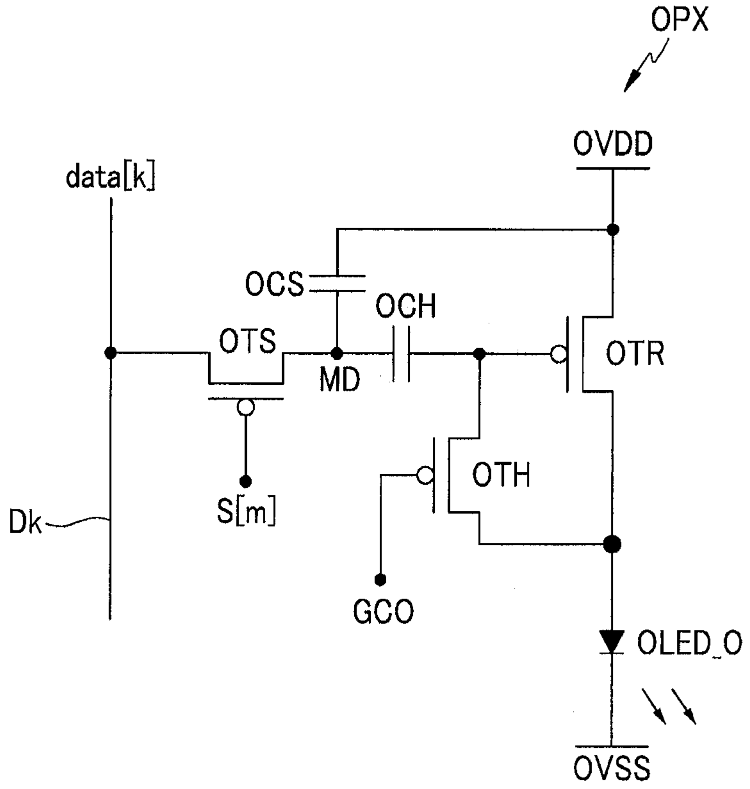

FIGS. 5A and 5B are circuit diagrams of a pixel structure corresponding to a first unit area pixel E and a second unit area pixel O among the first group pixels and the second group pixels.

Referring to FIG. 5A, a first group pixel EPX included in the first unit area pixel E includes a switching transistor ETS, a driving transistor ETR, a compensation transistor ETH, a compensation capacitor ECH, and a storage capacitor ECS.

The driving transistor ETR includes a drain electrode to which an anode of an organic light emitting diode (OLED) OLED_E is connected, a gate electrode connected to a first electrode of the compensation capacitor ECH, and a source electrode connected to a first power voltage EVDD. The driving transistor ETR controls a driving current supplied to the OLED OLED_E.

The compensation transistor ETH includes a gate electrode to which a first compensation control signal GCE is input and two electrodes respectively connected to the drain electrode and the gate electrode of the driving transistor ETR.

A second electrode of the compensation capacitor ECH is connected to a first electrode of the storage capacitor ECS and a first electrode of the switching transistor ETS at a node MD. A second electrode of the storage capacitor ECS is connected to the first power voltage EVDD.

A scan signal S[i] is input to a gate electrode of the switching transistor ETS, and a second electrode of the switching transistor ETS is connected to a data line Dj. A data signal data[j] is transmitted through the data line Dj.

A cathode of the OLED OLED_E is connected with a second power voltage EVSS.

The first power voltage EVDD and the second power voltage EVSS supply driving voltages for driving of the pixel. In further detail, the first power voltage EVDD and the second power voltage EVSS supply driving voltages required for operation of the driving transistor ETR and the OLED OLED_E according to a reset period 1, a compensation period 2, a scan period 3, and a light emission period 4.

The first power voltage EVDD has at least two levels according to the reset period 1, the compensation period 2, the scan period 3, and the light emission period 4. The first compensation control signal GCE is a level that turns on the compensation transistor ETH during the compensation period 2.

The scan signal S[i] has at least two levels according to the reset period 1, the compensation period 2, the scan period 3, and the light emission period 4. In further detail, the scan signal S[i] has a level that turns on the switching transistor ETS during which a data signal is programmed to the corresponding scan line during at least the compensation period 2 and the scan period 3.

The second power voltage EVSS may be maintained with a constant level, or a voltage level of the second power voltage EVSS during the reset period 1 may be different from those of the other three periods. In other words, the voltage level of the second power voltage EVSS may be maintained to be constant, or during the reset period 1, may be different from the voltage levels of the other three periods.

As shown in FIG. 5B, a second group pixel OPX included in the second unit area pixel O includes a switching transistor OTS, a driving transistor OTR, a compensation transistor OTH, a compensation capacitor OCH, and a storage capacitor OCS.

The driving transistor OTR includes a drain electrode to which an anode of an OLED OLED_O is connected, a gate electrode connected to a first electrode of the compensation capacitor OCH, and a source electrode connected to a third power source voltage OVDD.

The compensation transistor OTH includes a gate electrode to which a second compensation control signal GCO is input and two electrodes respectively connected to a drain electrode and a gate electrode of the driving transistor OTR.

A second electrode of the compensation capacitor OCH is connected to a first electrode of the storage capacitor OCS and a first electrode of the switching transistor OTS at a node MD. A second electrode of the storage capacitor OCS is connected to the third power source voltage OVDD.

A scan signal S[m] is input to a gate electrode of the switching transistor OTS and a second electrode of the switching transistor OTS is connected with a data line Dk. A data signal data[k] is transmitted through the data signal data line Dk.

A cathode of the OLED OLED_O is connected with a fourth power source voltage OVSS.

The third power source voltage OVDD has at least two levels according to the reset period 1, the compensation period 2, the scan period 3, and the light emission period 4. The second compensation control signal GCO is a level that turns on the compensation transistor OTH during the compensation period 2.

The scan signal S[m] has at least two levels according to the reset period 1, the compensation period 2, the scan period 3, and the light emission period 4. In further detail, the scan signal S[m] is a level that turns on the switching transistor OTS for a period during which a data signal is input to the corresponding scan line during at least the compensation period 2 and the scan period 3.

The fourth power source voltage OVSS may be maintained with a constant level, or a voltage level of the fourth power source voltage OVSS during the reset period 1 may be different from those of the other three periods.

As described, in the pixel structure according to the exemplary embodiment of the present invention, the first group pixel EPX and the second group pixel OPX are the same in structure and operation.

A first pixel is a pixel of the first unit area pixels E, and therefore it is driven during the first field EFD, and a second pixel is a pixel of the second unit area pixels O, and therefore it is driven during the second field OFD.

The OLED display device according to the exemplary embodiment of the present invention has a display panel that is designed to be applied in the array structures in which the first group pixels PEX and the second group pixels OPX are arrayed in plural as shown in FIGS. 2, 3A, 3B, 4A, and 4B and is designed to perform operation with the above-described structure.

That is, a display panel where the first group pixels EPX and the second group pixels OPX are arrayed in plural along the first area and the second area includes wires for supplying the first power voltage EVDD and the third power voltage OVDD, wires for supplying scan signals, and wires for supplying the first and second compensation control signals GCE and GCO.

Figure 6:
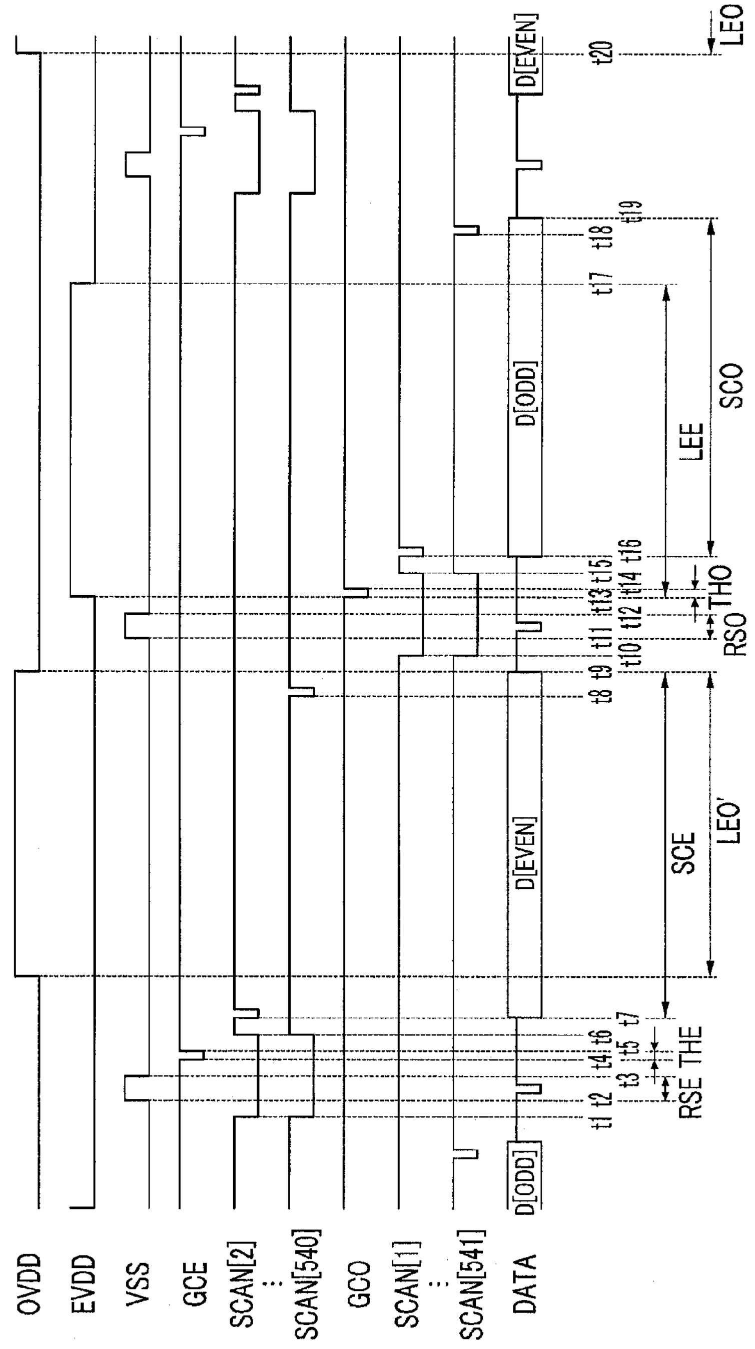
FIG. 6 is a signal timing view of a driving method of the OLED display device according to an exemplary embodiment of the present invention.

FIG. 6 is a signal timing diagram illustrating a driving method of the OLED display device according to the exemplary embodiment of the present invention, based on the pixel circuit structure of FIG. 5A and FIG. 5B.

In particular, FIG. 6 shows a driving method of a pixel in the first field EFD and the second field OFD for one frame when being applied to FIG. 1. Thus, the OLED display device according to embodiments of the present invention is not limited to the driving method of FIG. 6. As an exemplary driving method of a stereoscopic image according to another exemplary embodiment of the present invention, the driving method of FIG. 6 may be a pixel driving method of the first field EFD and the second field OFD displaying a left-eye image or a right-eye image during one frame.

The signal timing diagram according to the exemplary embodiment of FIG. 6 is based on the pixels of FIG. 5A and FIG. 5B, and therefore it may be applied to a pixel circuit realized as a PMOS transistor.

First, referring to FIG. 6, scan signals SCAN[2] to SCAN [540] transmitted to pixels of the first field EFD, that is, the plurality of first group pixels EPS for emitting in the first field EFD, have a first level (e.g., a predetermined first level) at a time t1. For convenience, the plurality of the first group pixels corresponds to pixels in an even-numbered pixel row. In this case, the first level may be regarded as a predetermined voltage level, for example, a low level that turns on the PMOS transistor.

Since the scan signal transmitted to the plurality of first group pixels has a low level during a period from the time t1 to a time t6, switching transistors ETS of the corresponding pixels are turned on during the period.

The second power voltage VSS is transmitted with a second level (e.g., a predetermined second level) from the time t2 to the time t3 during the turn-on period of the switching transistor ETS. The second level may be a high level that is higher than a predetermined voltage level that turns off the PMOS transistor. However, the present invention is not limited thereto, and the second level may set to be relatively high in relation to the first power voltage (EVDD, OVDD).

During the period from the time t2 to the time t3, a data signal applied to the source electrodes of the switching transistors ETS of the plurality of first group pixels has a third level (e.g., a predetermined third level). In this case, the third level may be a low level that is lower than a voltage level (e.g., a predetermined voltage level) that turns on the PMOS transistor.

A voltage according to a low data signal having the third level is transmitted to the node MD through the turn-on switching transistors ETS of the plurality of the first group pixels. Then, a gate electrode voltage of the driving transistor ETR is decreased by the voltage according to the low data signal having the third level due to a coupling effect, and accordingly the driving transistor ETR is turned on. In this case, a current path is formed from the second power voltage VSS that is a high voltage to the first power voltage VDD that is a low voltage. Accordingly, a data voltage according to a data signal of the previous frame is reset. Thus, the period from the time t2 to the time t3 is a reset period 1 RSE of the driving transistors ETR of the plurality of first group pixels.

Then, still during the turn-on period of the switching transistor ETS of the first group pixel, the compensation control signal GCE transmitted to the compensation transistor ETH is shifted to the first level at the time t4. The compensation control signal GCE is maintained with a low level of the first level during a period from the time t4 to a time t5. Then, the compensation transistor ETH is turned on and the driving transistor ETR is diode-connected. During the diode-connecting period, the second power voltage VSS is in the low-level state. Due to the diode-connection, a voltage at the gate electrode of the driving transistor ETR is the sum of the first power voltage EVDD and a threshold voltage Vth. The threshold voltage Vth of the driving transistor ETR is eliminated in an equation for calculation of a driving current according to an image data signal to be programmed later. Thus, the period from the time t4 at which the driving transistor ETR is diode-connected to the time t5 becomes a threshold voltage compensation period 2 THE.

After all the scan signals SCAN[2] to SCAN[540] are shifted to a high level at a time t6, the scan signals SCAN[2] to SCAN[540] are sequentially transmitted in the low level of the first level to the plurality of first group pixels EPX from a time t7 to a time t8. The period from the time t7 to the time t8 becomes a scan period 3 of the plurality of first group pixels EPX. Then, the switching transistors ETS of the plurality of first group pixels are sequentially turned on, and the node MD is received with the corresponding image data signal. The storage capacitors ECS of the plurality of first group pixels EPX sequentially store voltage of data signals according to voltage differences between a third level voltage (e.g., a predetermined third level voltage) applied during the reset period RSE and voltages of the respective image data signals. Thus, a period from the time t7 to the time t9 becomes a programming period SCE during which the data signal is programmed to the plurality of first group pixels EPX.

During a period from a time t13 to a time t17, the first power voltage EVDD of the plurality of first group pixels EPX is shifted to the third level (e.g., the predetermined third level). The third level is a high level that is higher than the second power voltage VSS. Thus, during the period from the time t13 to the time t17, the plurality of first group pixels EPX respectively emit light according to driving currents corresponding to the programmed image data signals. That is, the period from the time t13 to the time t17 becomes a light emission period 4 LEE of the first field.

Referring to FIG. 6, after the programming period SCE of the plurality of first group pixels EPX is terminated, the scan signals SCAN[1] to SCAN[541] transmitted to the plurality of second group pixels OPX are shifted to the first level at a time t10. After that, like the plurality of first group pixels EPX, a reset period RSO of the plurality of second group pixels OPX is continued during a period from a time t11 to a time t12. In addition, during the period from the time t13 to the time t14, the compensation control signal GCO is transmitted in low level to the compensation transistor OTH of each of the plurality of second group pixels OPX such that the compensation period THO of the driving transistor OTR is continued. Next, the scan signals SCAN[1] to SCAN[541] are sequentially transmitted in low level to the switching transistors OTS of the plurality of second group pixels OPX during a period from a time t16 to a time t18 such that image data signals are programmed to the plurality of second group pixels OPX during the period from t16 to t19. That is, the period from the time t16 to t19 becomes a programming period SCO during which data signals are programmed to the plurality of group pixels OPX.

After the programming period SCO is passed, the first power voltage OVDD supplied to the plurality of second group pixels OPX is shifted to a second level that is a high level from a time t20, and therefore the plurality of second group pixels OPX emit light with driving currents according to the data signals respectively stored in the plurality of second group pixels OPX. That is, the light emission period LEO of the plurality of second group pixels OPX is started.

Referring to FIG. 6, the light emission period LEE of the field overlaps the threshold voltage compensation period THO and the programming period SCO of the second field, but it does not overlap the light emission period LEO of the second field. In addition, the light emission period LEE of the first field does not overlap a light emission period LEO' of a second field of the previous frame. That is, the voltage level of the first power voltages EVDD and OVDD respectively supplied to the plurality of first group pixels EPX and the plurality of second group pixels OPX is alternately maintained to be high to thereby alternately realize the light emission period LEE of the first field and the light emission period LEO of the second field in one frame. Further, a threshold voltage compensation period and a data programming period of one group pixels are assured during a light emission period of the other group pixels so that a time margin for image realization can be assured.

Thus, in order to drive the OLED display device according to embodiments of the present invention using the driving method of FIG. 6, wires that transmit the first power voltage and the compensation control signal at different time points respectively to the plurality of first group pixels EPX and the plurality of second group pixels OPX may be required. In addition, scan lines that transmit scan signals for activation of pixels corresponding to each of the plurality of first group pixels EPX and the plurality of second group pixels OPX at different timing may be required.

However, in order to drive one display panel divided into two groups, wire connection becomes complicated, and accordingly production cost may be increased. Thus, the OLED display device according to embodiments the present invention provides alignment of the display panel described hereinafter to solve the problem.

First, referring to FIG. 7 to FIG. 10, a layout view illustrating a lay-out of sequential layering of the first group pixels EPX or the second group pixels OPX shown in FIG. 5A and FIG. 5B will be described before describing the entire layout view according to the layout structure of the display panel of the OLED display device.

Since the first group pixel EPX and the second group pixel OPX have substantially the same circuit structure, they will not be described separately in reference to the circuit structure of FIG. 7 to FIG. 10.

Hereafter, a first unit area pixel E or a second unit area pixel O is formed of sub-pixels R, G, B according to an exemplary embodiment of the present invention.

Thus, a circuit structure of the first group pixel EPX or the second group pixel OPX may be a circuit structure of the sub-pixels R, G, and B.

Figure 7:
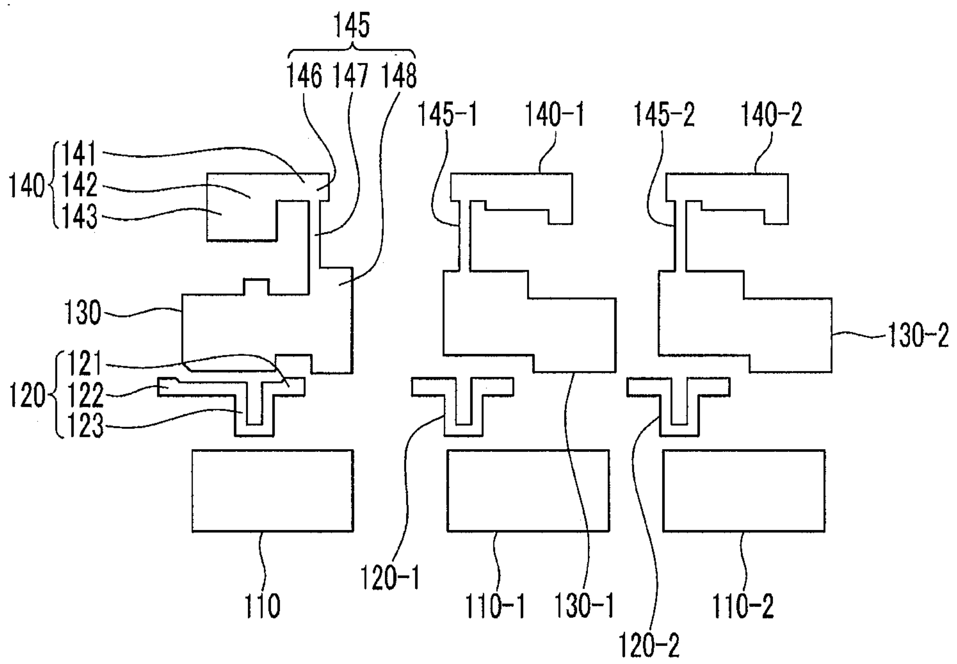
FIGS. 7, 8, 9, and 10 are layout views of a layering sequence of one pixel shown in FIG. 5A and FIG. 5B in the OLED display device according to an exemplary embodiment of the present invention.

In FIG. 7, a sub-pixel B, a sub-pixel G, and a sub-pixel R are sequentially arranged in one pixel according to the present exemplary embodiment. However, the sub-pixel arrangement in each pixel according to embodiments of the present invention is not limited thereto.

First, as shown in FIG. 7, a driving active layer 142, a switching active layer 123, a compensation active layer 147, a first storage capacitor electrode 110, and a first compensation capacitor electrode 130 are formed to configure the sub-pixel B according to the present exemplary embodiment. The driving active layer 142, the switching active layer 123, the compensation active layer 147, the first storage capacitor electrode 110, and the first compensation capacitor electrode 130 are formed using the same material at the same layer.

In addition, in the exemplary embodiment of the present invention, a driving source electrode 143, a driving drain electrode 141, a switching source electrode 122, a switching drain electrode 121, a first compensation electrode 146, and a second compensation electrode 148 are formed using the same material at the same layer where the driving active layer 142, the switching active layer 123, and the compensation active layer 147 are formed.

Hereinafter, the driving active layer 142, the driving source electrode 143, and the driving drain electrode 141 are referred to as a driving transistor semiconductor layer 140; the switching active layer 123, the switching source electrode 122, and the switching drain electrode 121 are referred to as a switching transistor semiconductor layer 120; and the compensation active layer 147, the first compensation electrode 146, and the second compensation electrode 148 are referred to as a compensation transistor semiconductor layer 145.

Further, the driving transistor semiconductor layer 140, the switching transistor semiconductor layer 120, the compensation transistor semiconductor layer 145, the first storage capacitor electrode 110, and the first compensation capacitor electrode 130 are collectively referred to as a semiconductor layer pattern.

As shown in FIG. 7, two semiconductor patterns are additionally formed spaced from the semiconductor layer pattern of the sub-pixel B so as to configure the sub-pixel G and the sub-pixel R, respectively. That is, a semiconductor layer pattern of a driving transistor semiconductor layer 140-1, a switching transistor semiconductor layer 120-1, a compensation transistor semiconductor layer 145-1, a first storage capacitor electrode 110-1, and a first compensation capacitor electrode 130-1 are formed to configure the sub-pixel G. In addition, a semiconductor layer pattern of a driving transistor semiconductor layer 140-2, a switching transistor semiconductor layer 120-2, a compensation transistor semiconductor layer 145-2, a first storage capacitor electrode 110-2, and a first compensation capacitor electrode 130-2 are formed to configure the sub-pixel R.

In one embodiment, the semiconductor layer pattern is formed, for example, by patterning a polycrystalline silicon layer.

Among the semiconductor layer pattern, the driving source electrode 143, the driving drain electrode 141, the switching source electrode 122, the switching drain electrode 121, the first compensation electrode 146, and the second compensation electrode 148 are doped with an impurity so that they become a conductor. That is, a driving gate electrode 144, a switching gate electrode 124, a compensation gate electrode 149 that are shown in FIG. 8 are formed on the driving active layer 142, the switching active layer 123, and the compensation active layer 147, and an impurity is doped to the driving active layer 142, the switching active layer 123, and the compensation active layer 147 using the driving gate electrode 144, the switching gate electrode 124, and the compensation gate electrode 149 as doping prevention layers.

The impurity may be a P-type impurity, such as, for example, aluminum, boron, gallium, or indium. However, exemplary embodiments of the present invention are not limited thereto, and an N-type impurity may be doped as necessary.

Figure 8:
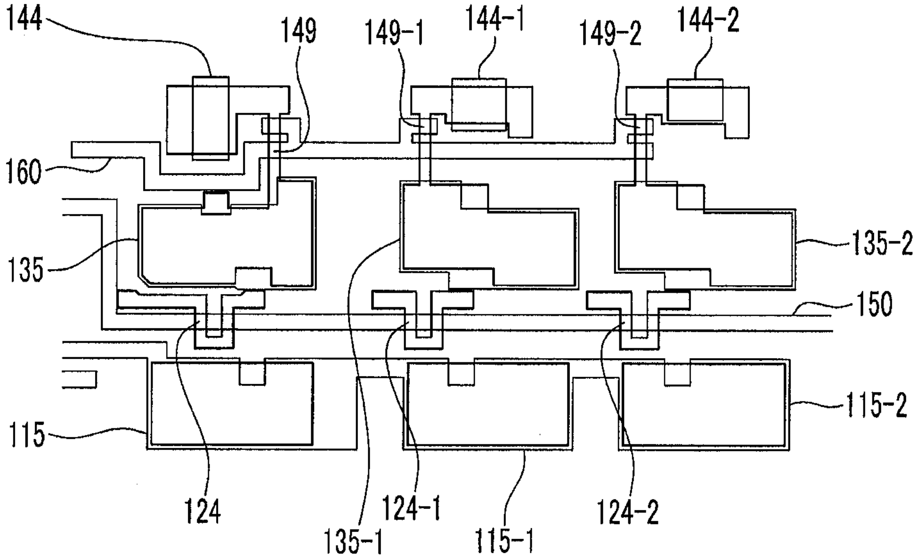

Referring to FIG. 8, the driving gate electrode 144, the switching gate electrode 124, the compensation gate electrode, a scan line, a second storage capacitor electrode, a second compensation capacitor electrode 135, and a horizontal compensation line 160 are formed on the same layer using the same material on the semiconductor layer pattern with an insulation layer interposed therebetween.

Each of the driving gate electrode 144, the switching gate electrode 124, the compensation gate electrode 149, the scan line 150, the second storage capacitor electrode 115, the second compensation capacitor electrode 135, and the horizontal compensation line 160 may be referred to as a gate wire.

The insulation layer disposed between the semiconductor layer pattern and the gate wire may be particularly defined as a gate insulating layer.

As shown in FIG. 8, two gate wires are additionally formed to configure the sub-pixel G and the sub-pixel R, respectively, in addition to the sub-pixel B. That is, a driving gate electrode 144-1, a switching gate electrode 124-1, a compensation gate electrode 149-1, a second storage capacitor electrode 115-1, and a second compensation capacitor electrode 135-1 are formed to configure the sub-pixel G. A driving gate electrode 144-2, a switching gate electrode 124-2, a compensation gate electrode 149-2, a second storage capacitor electrode 115-2, and a second compensation capacitor electrode 135-2 are formed to configure the sub-pixel R.

In addition, the scan line 150 and the horizontal compensation line 160 of the gate wire are horizontally extended to areas of the sub-pixels B, G, and R.

In one embodiment, the gate wire is formed, for example, by patterning a metal layer.

The metal layer includes at least one of various metallic materials known to a person skilled in the art, and the metallic materials may include one or more of molybdenum (Mo), chromium (Cr), aluminum (Al), silver (Ag), titanium (Ti), tantalum (Ta), tungsten (W), and combinations thereof.

The insulation layer includes at least one of various insulating materials known to a person skilled in the art, and the insulating materials may include various organic layers or an inorganic layer such as tetra ethyl ortho silicate (TEOS), silicon nitride (SiNx), or silicon oxide ($SiO_2$).

Referring to FIG. 8, the shape and the arrangement of the gate wire will be described in further detail.

The driving gate electrode 144 is disposed (e.g., arranged at a predetermined location) on the driving active layer 142, and the switching gate electrode 124 is disposed (e.g., arranged at a predetermined location) on the switching active layer 123. In addition, the compensation gate electrode 149 is disposed (e.g., arranged at a predetermined location) on the compensation active layer 147.

Thus, the driving gate electrode 144 partially overlaps the driving active layer 142, the switching gate electrode 124 partially overlaps the switching active layer 123, and the compensation gate electrode 149 partially overlaps the compensation active layer 147.

For example, the switching gate electrode 124 may be a portion of the scan line 150, overlapping the switching active layer 123. Here, the scan line 150 is located between a compensation capacitor and a storage capacitor.

In addition, the compensation gate electrode 149 may be a portion of the horizontal compensation line 160, overlapping the compensation active layer 147. Here, the horizontal compensation line 160 is located between the driving transistor semiconductor layer 140 and the compensation capacitor.

Here, the second storage capacitor electrode 115 is disposed to be overlapped with the first storage capacitor electrode 110 with the insulation layer interposed therebetween. In addition, the second compensation capacitor electrode 135 is disposed to be overlapped with the first compensation capacitor electrode 130 with the insulation layer interposed therebetween.

The insulation layer disposed between the first and second storage capacitor electrodes 110 and 115 and the insulation layer disposed between the first and second compensation capacitor electrodes 130 and 135 may be dielectric materials.

The first and second storage capacitor electrodes 110 and 115, or the first and second compensation capacitor electrodes 130 and 135, may be overlapped with each other in substantially the same shape, and the overlapped shapes may be different from each other by including a connection portion (e.g., a predetermined connection portion) for connection of wires according to a pixel circuit structure.

That is, a connector pattern (e.g., a predetermined connector pattern) may be formed for connection of the respective configuration according to the pixel circuit structure of FIG. 5A or FIG. 5B.

In order to connect first electrodes of the storage capacitors ECS and OCS and second electrodes of the compensation capacitors ECH and OCH to each other, the second storage capacitor electrode 115 that corresponds to the second electrode of the storage capacitors ECS and OSC is partially patterned so as to make the first storage capacitor electrode 110 that corresponds to the first electrodes of the storage capacitors ECS and OSC exposed to be connected with the second electrodes through a connection wire 185. The patterned portion of the second storage capacitor electrode 115 may become a contact hole. Then, the contact hole and a part of the second compensation capacitor electrode 135 that corresponds to the second electrodes of the compensation capacitors ECH and OCH are connected through the connection wire 185.

In order to connect first electrodes of the compensation capacitors ECH and OCH and the gate electrodes of the driving transistors ETR and OTR to each other, the second compensation capacitor electrode 135 that corresponds to the second electrodes of the compensation electrodes ECH and OCH is partially patterned to make the first compensation capacitor electrode 130 that corresponds to the first electrodes of the compensation capacitors ECH and OCH exposed to be connected with the gate electrode through a connection wire 180. A part of the first compensation capacitor electrode 130, exposed by partially patterning the second compensation capacitor electrode 135, becomes a contact hole. Then, the contact hole and a part of the gate electrode 144 of the driving transistor are connected through the connection wire 180.

Referring to FIG. 8, in the pixel alignment according to the exemplary embodiment of the present invention, the second storage capacitor electrodes 115, 115-1, and 115-2 of the respective sub-pixels R, G, and B are connected to each other so as to horizontally supply a power voltage to the respective sub-pixels R, G, and B.

Since the second storage capacitor electrodes 115, 115-1, and 115-2 of the respective sub-pixels B, G, and R are connected to each other, the power voltage is horizontally supplied to all the sub-pixels when a power voltage line is connected to a part of the second storage capacitor electrodes 115, 115-1, and 115-2.

Figure 9:
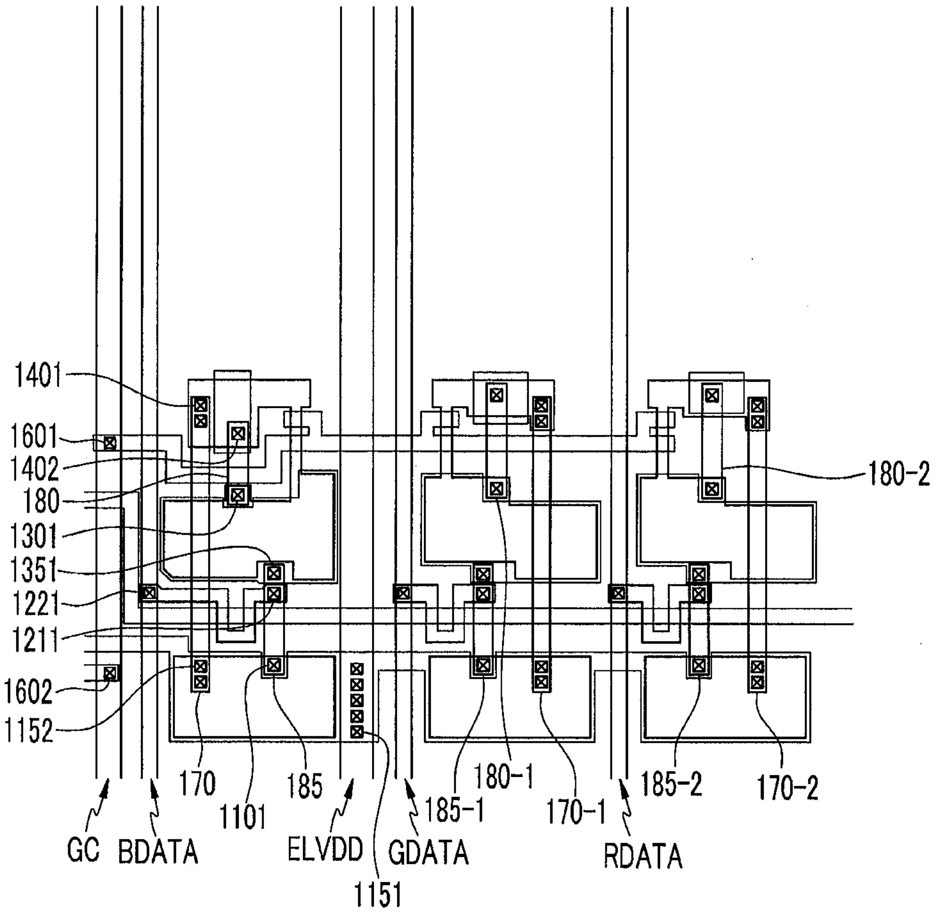

As shown in FIG. 9, data lines BDATA, GDATA, and RDATA, a first power line ELVDD, a vertical compensation line GC, second power lines 170, 170-1, and 170-2, first connection wires 180, 180-1, and 180-2, and second connection wires 185, 185-1, and 185-2 that respectively correspond to the sub-pixels R, G, and B are formed on the gate wire with the insulation layer interposed therebetween.

That is, referring to FIG. 9, a data line, a second power line, a first connection wire, and a second connection wire are formed in the corresponding sub-pixel, and one first power line and one vertical compensation line are arranged in one pixel.

Hereinafter, the data lines BDATA, GDATA, and RDATA, the first power line ELVDD, the vertical compensation line GC, the second power lines 170, 170-1, and 170-2, the first connection wires 180, 180-1, and 180-2, and the second connection wires 185, 185-1, and 185-2 are referred to as a data wire.

In one embodiment, the data wire is formed, for example, by patterning a metal layer.

The data line BDATA of the sub-pixel B overlaps the switching source electrode 122 of the switching transistor semiconductor layer 120 in an area where the sub-pixel B is located. A contact hole 1221 is formed in an area where the data line BDATA and the switching source electrode 122 are overlapped with each other. The sub-pixel B receives an image data signal from the data line BDATA connected through the contact hole 1221. Like the sub-pixel B, the sub-pixel G and the sub-pixel R are respectively provided with a data line GDATA and a data line RDATA. The data lines are extended in a vertical direction to the plurality of pixels.

The vertical compensation line GC is provided to each of a plurality of pixels, is extended in a direction perpendicular to the direction in which the sub-pixels of each of the plurality of pixels are arranged, and is connected to the horizontal compensation line 160 that horizontally connects the sub-pixels that configure each pixel. Thus, the vertical compensation line GC may be disposed in any place where the sub-pixels of the pixel are arranged. FIG. 9 illustrates that the vertical compensation line GC is disposed at a left-side portion of the sub-pixel B.

A contact hole 1601 is formed in an area where the vertical compensation line GC and the horizontal compensation line 160 are overlapped with each other, and compensation control signals transmitted to the horizontal compensation line 160 from the vertical compensation line GC are applied to compensation gate electrodes 149, 149-1, and 149-2 of the compensation transistor semiconductor layers of the respective sub-pixels B, G, and R.

The vertical compensation line GC extended in the vertical direction includes one or more contact holes connected with the respective horizontal compensation lines of the plurality of pixels, and a contact hole 1602 of FIG. 9 is provided for connection with a horizontal compensation line of another pixel (not shown).

The first power line ELVDD is extended in the vertical direction to the plurality of pixels, and is partially connected to the second storage capacitor electrodes 115, 115-1, and 115-2 that are respectively connected in parallel with sub-pixels of the pixel. Thus, the first power line ELVDD may be disposed at any area corresponding to the sub-pixels of the pixel. In FIG. 9, the first power line ELVDD is disposed between the sub-pixel B and the sub-pixel G.

Referring to FIG. 9, at least one contact hole 1151 is formed in an area where the first power line ELVDD and the second storage capacitor electrode 115 of the sub-pixel area B are overlapped with each other. The first power voltage EVDD transmitted from the first power line ELVDD through the contact hole 1151 is horizontally supplied to the second storage capacitor electrodes 115, 115-1, and 115-2 of the respective sub-pixels.

Here, in the pixel circuit structure according to the embodiment of the present invention shown in FIGS. 5A and 5B, the first power voltage EVDD supplied to the second storage capacitor electrode 115 is also supplied to the source electrode of the driving transistor, and therefore the second power line 170 that connects the second storage capacitor electrode 115 and the driving source electrode 143 is formed. As in the sub-pixel B, the second power lines 170-1 and 170-2 are respectively formed in the sub-pixels G and R.

In the second power line 170, at least one contact hole 1152 and at least one contact hole 1401 are respectively formed in areas overlapped with the second storage capacitor electrode 115 and the source electrode 143 of the driving transistor. Through the contact holes 1152 and 1401, the first power voltage EVDD supplied to the second storage capacitor electrode 115 through the first power line ELVDD is transmitted to the source electrode 143 of the driving transistor.

The first connection wire 180 is overlapped with the first compensation capacitor electrode 130 and the driving gate electrode 144, and contact holes 1301 and 1402 are formed in the overlapped areas. The first compensation capacitor electrode 130 and the driving gate electrode 144 are connected with each other through the contact holes 1301 and 1402. In particular, for such a connection, the contact hole 1301 is formed in a portion patterned to be exposed as a connection portion of the first compensation capacitor electrode 130 when forming the second compensation capacitor electrode 130. As in the sub-pixel B, the first connection wires 180-1 and 180-2 are respectively formed in the sub-pixels G and R.

The second connection wire 185 is overlapped with the first storage capacitor electrode 110, the second compensation capacitor electrode 135, and the switching drain electrode 121, and contact holes 1101, 1351, and 1211 are respectively formed in the overlapped areas. Through the contact holes 1101, 1351, and 1211, the first storage capacitor electrode 110, the second compensation capacitor electrode 135, and the switching drain electrode 121 are respectively connected with each other. In particular, for such a connection, the contact hole 1101 is formed in an area patterned to be exposed as a connection portion of the first storage capacitor electrode 110 when forming the second storage capacitor electrode 115. As in the sub-pixel B, second connection wires 185-1 and 185-2 are respectively formed in the sub-pixels G and R.

In the described embodiment, the above-stated contact holes are formed, for example, before data wires are formed.

Figure 10:
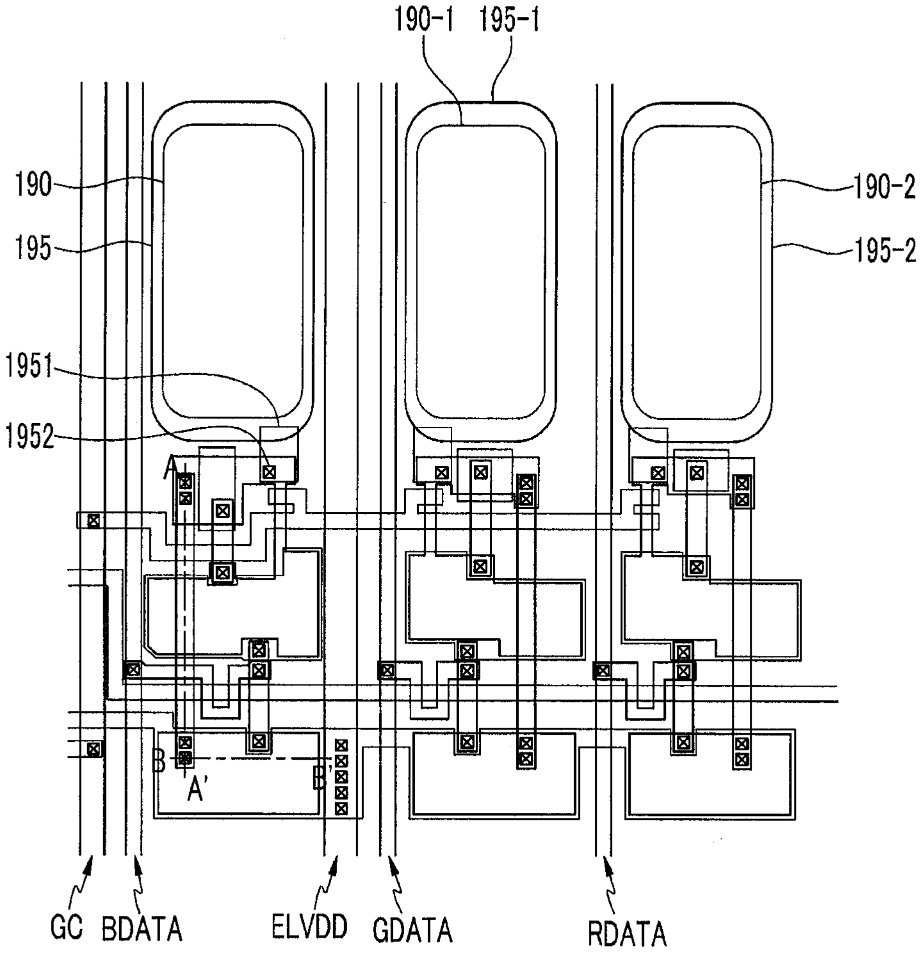

As shown in FIG. 10, after the data wires are formed, an organic light emitting diode OLED is formed thereon. A first electrode 195 of the organic light emitting diode OLED is connected with the driving drain electrode 144. In FIG. 10, the first electrode 195 of the organic light emitting diode OLED is an anode, and is connected with the driving drain electrode 144 through a connection portion 1951. The first electrode 195 of the organic light emitting diode OLED and the connection portion 1951 are formed as transparent conductive layers, and the OLED display device may further include other wires formed of the same material as the first electrode 195 of the organic light emitting diode OLED at the same layer where the first electrode 195 of the organic light emitting diode OLED is formed. The connection portion 1951 is connected with the driving drain electrode 144 through a contact hole 1952.

The transparent conductive layer includes at least one of indium tin oxide (ITO), indium zinc oxide (IZO), zinc indium tin oxide (ZITO), gallium indium tin oxide (GITO), Indium Oxide ($In_2O_3$), zinc oxide (ZnO), gallium indium zinc oxide (GIZO), gallium zinc oxide (GZO), fluorine tin oxide (FTO), or aluminum-doped zinc oxide (AZO).

An organic emission layer 190 is formed on the first electrode 195 of the organic light emitting diode OLED, and a second electrode, that is, a cathode (not shown), is formed on the organic emission layer 190. That is, although the cathode is not illustrated in FIG. 10, cathodes of the respective sub-pixels are integrally connected such that they can be formed as one layer. The cathode is an electrode supplied with the second power voltage VSS according to the driving method of FIG. 6.

Referring to FIG. 10, in the sub-pixels G and R, excluding the sub-pixel B, first electrodes 195-1 and 195-2 (i.e., anodes) of organic light emitting diodes, organic emission layers 190-1 and 190-2, and second electrodes (not shown) (i.e., cathodes) of the organic light emitting diodes OLED are respectively formed.

The OLED display device according to embodiments of the present invention is a bottom emission type display device, but the present invention is not limited thereto. The organic light emitting diode OLED includes an anode for injecting holes, a cathode for injecting electrons, and an organic emission layer 190. When an exciton, which is generated when a hole and an electron injected into the organic emission layer 190 are coupled to each other, falls from an excited state to a ground state, light emission occurs.

Figure 11:
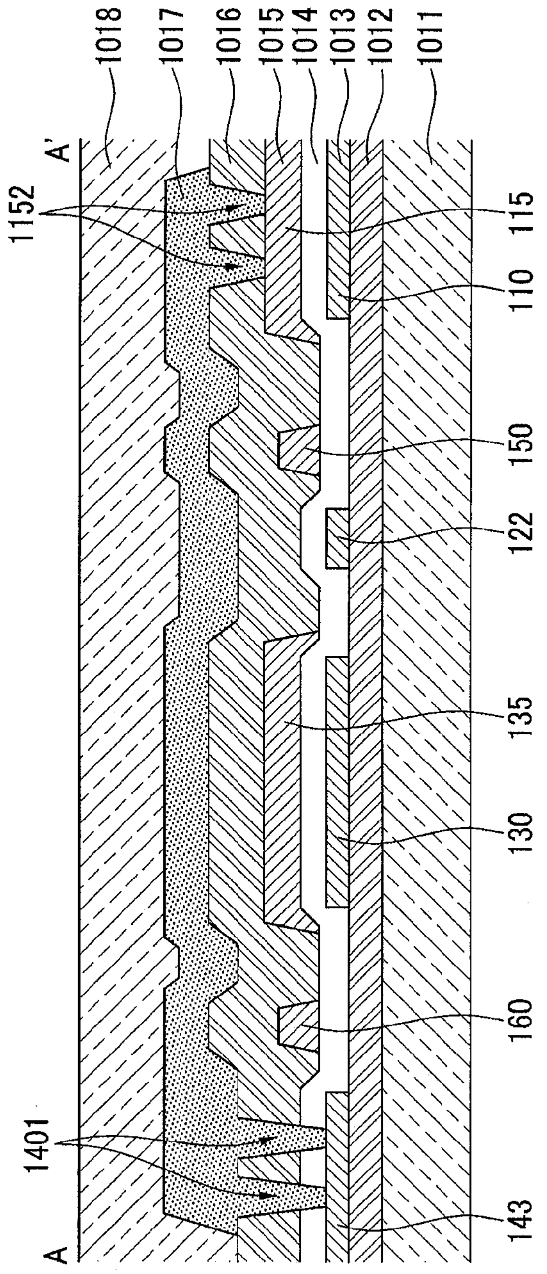
FIG. 11 is a cross-sectional view of FIG. 10, taken along the line A-A'.
Figure 12:
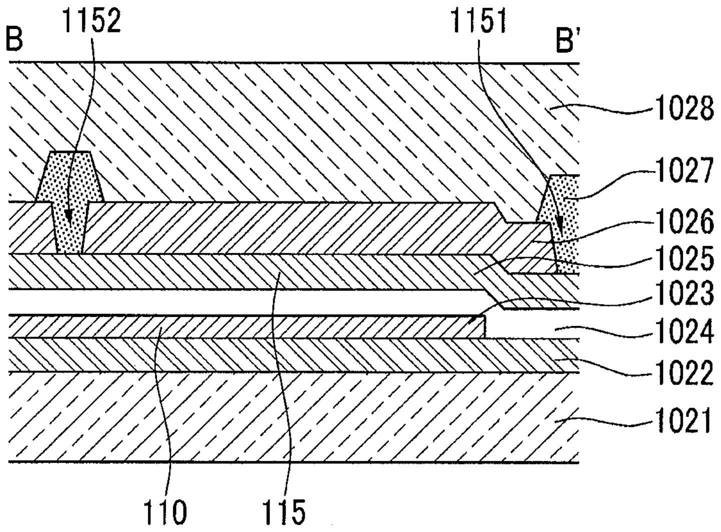
FIG. 12 is a cross-sectional view of FIG. 10, taken along the line B-B'.

FIG. 11 and FIG. 12 are cross-sectional views of FIG. 10, respectively taken along the portions A-A' and B-B'.

Referring to FIG. 11, in the portion A-A', a buffer layer 1012 formed of silicon oxide is formed on an insulation substrate 1011.

A polysilicon layer, which is a semiconductor layer, is formed by being patterned on the buffer layer 1012. The polycrystalline silicon layer becomes a semiconductor layer pattern 1012 like an active layer.

In a portion corresponding to the portion A-A', the semiconductor layer pattern 1013 forms the driving source electrode 143 of the driving transistor, the first compensation capacitor electrode 130, the switching source electrode 122 of the switching transistor, and the first storage capacitor electrode 110.

A gate insulating layer 1014 is formed on the semiconductor layer pattern 1013, and a gate wire 1015 formed of a metal layer is formed by being patterned on the gate insulating layer 1014.

In the portion corresponding to the portion A-A', a gate wire 1015 forms the horizontal compensation line 160, the second compensation capacitor electrode 135, the scan line 150, and the second storage capacitor electrode 115.

The semiconductor layer pattern 1013 is doped with an impurity after the gate wire 1015 is formed, and the gate wire 1015 functions as a doping prevention layer so that the driving source electrode 143 and the switching source electrode 122 may be doped with the impurity in the portion A-A'.

After the impurity is doped, an interlayer insulating layer 1016 is formed on the gate wire 1015. A plurality of contact holes are formed on the interlayer insulating layer 1016, and the interlayer insulating layer 1016 contacts the corresponding electrodes through the contact holes.

In addition, in the portion A-A', at least one contact hole 1401 for accessing the driving source electrode 143 and at least one contact hole 1152 for accessing the second storage capacitor electrode 115 are formed.

Then, an electrode wire 1017 is formed on the interlayer insulating layer 1016. The electrode wire 1017 corresponds to the second power line 170 of FIG. 9.

The electrode wire 1017 contacts the driving source electrode 143 and the second storage capacitor electrode 115 respectively through the contact holes 1401 and the contact holes 1152, and therefore the first power voltage VDD supplied to the second storage capacitor electrode 115 can be transmitted to the driving source electrode 143 from the second storage capacitor electrode 115.

Finally, a pixel defining layer 1018 is formed on the electrode wire 1017.

Referring to FIG. 12, in the portion B-B', a buffer layer 1022 is formed on an insulation substrate 1021. A first storage capacitor electrode 110 is formed as a semiconductor layer pattern 1023 on the buffer layer 1022.

A gate insulating layer 1023 and a second storage capacitor electrode 115 are sequentially formed on the first storage capacitor electrode 110. The second storage capacitor electrode 115 is a gate wire 1025 formed of a metal layer. As the gate wire 1025, the second storage capacitor electrode 115 functions as a doping prevention layer, the lower semiconductor layer pattern 1023 is not doped during an impurity doping process. An interlayer insulating layer 1026 is formed on the gate wire 1025, and a plurality of contact holes are formed in the interlayer insulating layer 1026. That is, contact holes 1151 and 1152 are formed to access the second storage capacitor electrode 115 as the gate wire 1025. Through the contact holes 1151 and 1152, an electrode wire 1027 is connected to the gate wire 1025. An electrode wire 1027 formed in the contact hole 1151 is the first power line ELVDD for supplying the first power voltage VDD, and an electrode wire 1027 formed in the contact hole 1152 is the second power line 170 for transmitting the first power voltage VDD supplied to the second storage capacitor electrode 115 as the gate wire 1025.

Finally, the pixel defining layer 1018 is formed on the electrode wire 1027 and the interlayer insulating layer 1026.

Figure 13:
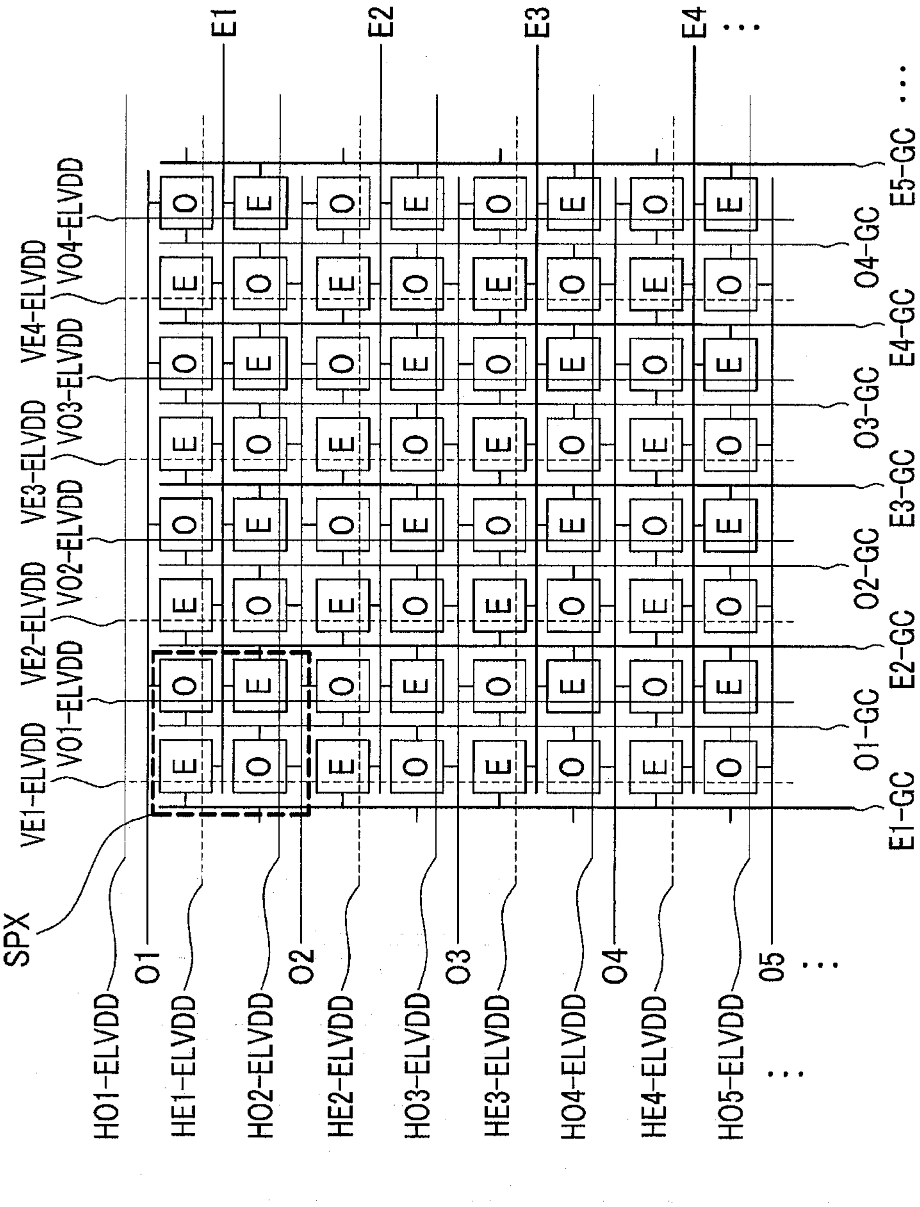
FIG. 13 schematically shows a 1×1 dot structure and alignment of various wires of the display panel of the OLED display device according to an exemplary embodiment of the present invention.

FIG. 13 schematically shows the 1×1 dot structure of the OLED display panel as shown in FIG. 2 and alignment of wires.

In order to realize the 1×1 dot structure, in the display panel according to embodiments of the present invention, a plurality of first vertical power lines V-ELVDD extended in the vertical direction are provided along the horizontal direction in each pixel line. In further detail, a first power line VE-ELVDD for supplying the first power voltage EVDD to a first unit area pixel E, and a first power line VO-ELVDD for supplying a third power voltage OVDD to a second unit area pixel O, are alternately provided the respective pixel lines.

In the 1×1 dot structure, an alignment order of the first power lines of the first unit area pixel E and the second unit area pixel O is not restricted. According to FIG. 13, a first power line VE1-ELVDD for supplying a voltage to the first unit area pixel E is arranged in the first pixel line, and a first power line VO1-ELVDD for supplying a voltage to the second unit area pixel O is arranged in the next pixel line. Power lines are alternately arranged in sequence (e.g., VE2-ELVDD, VO2-ELVDD, VE3-ELVDD, VO3-ELVDD, VE4-ELVDD, and VO4-ELVDD) from the next pixel line.

Here, according to pixel rows of the display panel, a first horizontal power line H-ELVDD that supplies the first power voltage ELVDD and the third power voltage OVDD supplied from the vertical first power line V-ELVDD to sub-pixels of each pixel in a horizontal direction is formed. In further detail, a first horizontal power line HE-ELVDD for horizontally transmitting the first power voltage EVDD to the first unit area pixel E, and a first horizontal power line HO-ELVDD for horizontally transmitting the third power voltage OVDD to the second unit area pixel O, are alternately arranged in each pixel row.

In the 1×1 dot structure, an alignment order of the first power lines in the horizontal direction of the first unit area pixel E and the second unit area pixel O is not restricted, but according to FIG. 13, the first horizontal power line HO1-ELVDD for transmitting the voltage to the second unit area pixel O in the horizontal direction is arranged in the upper portion of the first pixel row, and the first horizontal power line HE1-ELVDD for transmitting the voltage to the first unit area pixel E in the horizontal direction is arranged therebelow. In the second pixel row, a first power line HO2-ELVDD for transmitting the voltage to the second unit area pixel O in the horizontal direction is arranged. Hereinafter, the power lines are alternately arranged in sequence (e.g., HE2-ELVDD, HO3-ELVDD, HE3-ELVDD, HO4-ELVDD, HE4-ELVDD, HO5-ELVDD) according to the plurality of pixel rows.

The first horizontal power line H-ELVDD for supplying the voltage to sub-pixels of each pixel in the horizontal direction may be the second storage capacitor electrodes 115, 115-1, and 115-2 connected between sub-pixels, further, between pixels among the gate wires as shown in FIG. 7 to FIG. 10. Since the circuits of the respective pixels are alternately arranged vertically and the second storage capacitor electrodes 115,115-1, and 115-2 are alternately arranged vertically (this will be described later in reference to FIG. 14), the first horizontal power lines H-ELVDD for transmitting the first power voltage supplied to pixels corresponding to the first unit area pixel E and the second unit area pixels O in the horizontal direction are also alternately arranged for the respective pixels.

For example, a pixel of the first unit area pixel E arranged in the first pixel row of the first pixel line is supplied with the first power voltage EVDD from the first vertical power line VE1-ELVDD, and the pixel transmits the first power voltage EVDD to sub-pixels of the pixel through the first horizontal power line HE1-ELVDD (i.e., the second storage capacitor electrodes 115, 115-1, and 115-2).

Here, a pixel of the second unit area pixel O arranged in the second pixel row of the first pixel line is supplied with the first power voltage OVDD from the first vertical power line VO1-ELVDD, and transmits the first power voltage OVDD to sub-pixels of the pixel through the first horizontal power line HO1-ELVDD (i.e., the second storage capacitor electrodes 115,115-1, and 115-2). Although being included in the same pixel line, the pixel structure of the second unit area pixel O is vertically reverse (e.g., vertically inverted) to the pixel structure and alignment of the first unit area pixel E, so that the first horizontal power line is changed.

Here, as a 1×1 dot structure, a circuit structure of each pixel is vertically reversed (e.g., vertically inverted) and accordingly the scan line is alternately arranged for each pixel row.

That is, referring to FIG. 13, a first scan line O1 for transmitting a scan signal of the second unit area pixel O is formed above (e.g., at an upper portion of) the first pixel row.

Next, a first scan line E1 for transmitting a scan signal to the first unit area pixel E is formed below (e.g., at a lower portion of) the first pixel row.

From the next pixel row, scan lines of the second unit area pixel O and the scan lines of the first unit area pixel E are alternately arranged (e.g., O2, E2, O3, E3, O4, E4, O5).

A plurality of vertical compensation lines GC extended in the vertical direction are arranged along the plurality of pixel lines. In further detail, a vertical compensation line E-GV for transmitting a compensation control signal of the first unit area pixel E and a vertical compensation line O-GC for transmitting a compensation control signal of the second unit area pixel O, are alternately arranged in the horizontal direction along the pixel line. An alignment order of the vertical compensation line E-GC of the first unit area pixel E and the vertical compensation line O-GC of the second unit area pixel O is not limited in the 1×1 dot structure, but as shown in FIG. 12, a vertical compensation line E1-GC of the first unit area pixel E may be arranged in the first pixel line and a vertical compensation line O1-GC of the second unit area pixel O may be arranged in the second pixel line. From the next pixel line, vertical compensation lines may be alternately arranged (e.g., E2-GC, O2-GC, E3-GC, O3-GC, E4-GC, O4-GC, and E5-GC).

Figure 14:
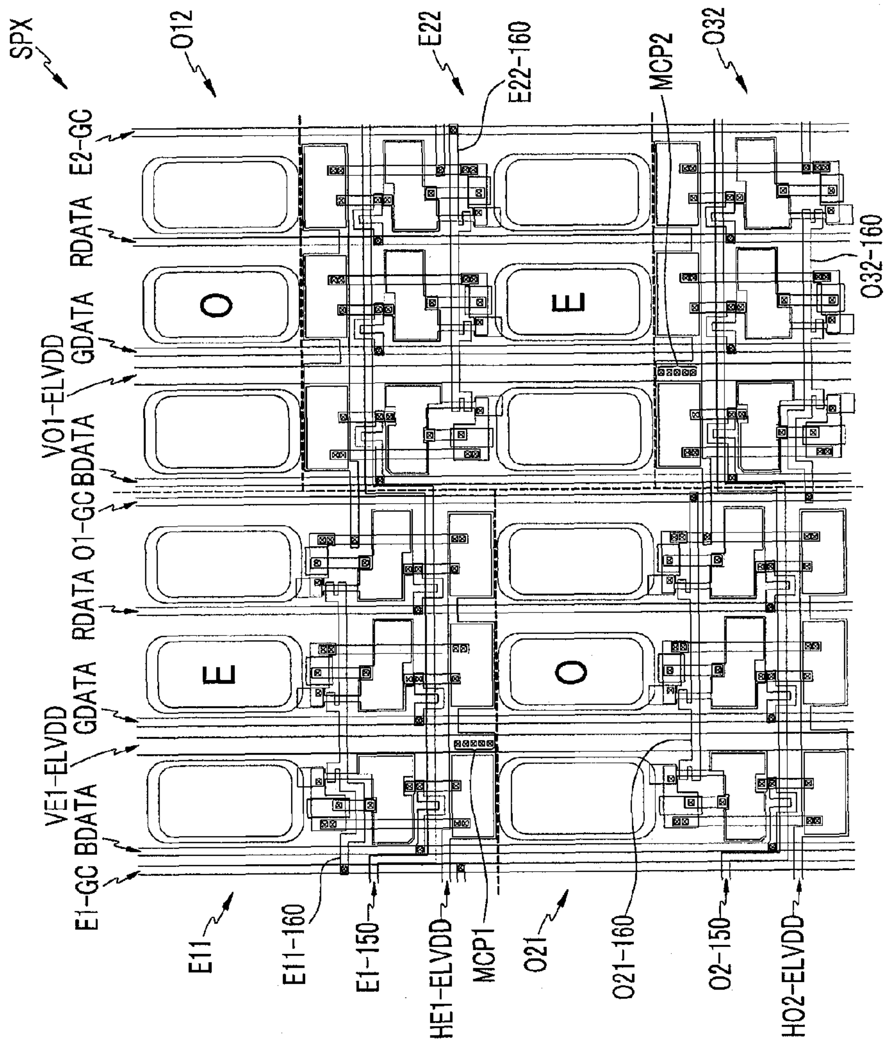
FIG. 14 is a layout view of an area SPX of FIG. 13.

FIG. 14 illustrates a circuit diagram of an area SPX defined by the first pixel row of the first pixel line, and the first and second pixel rows of the second pixel line shown in the layout view of FIG. 13 in detail.

In further detail, as shown in FIG. 14, an area SPX is formed of a pixel E11 of the first unit area corresponding to the first pixel line of the first pixel row, an emission unit of a pixel O12 of the second unit area corresponding to the second pixel line of the first pixel row, a pixel O21 of the second unit area corresponding to the first pixel line of the second pixel row, a pixel E22 of the first unit area corresponding to the second pixel line of the second pixel row, and a circuit unit of a pixel O32 of the second unit area corresponding to the second pixel line of the third pixel row. Here, the emission unit indicates the organic light emitting diode OLED, and the circuit unit indicates other constituent elements, excluding the organic light emitting diode. Particularly, the circuit unit indicates several constituent elements for supplying a driving current to the organic light emitting diode. Circuit units extended in the horizontal direction are vertically reverse (e.g., vertically inverted) to each other in the respective pixels.

However, the alignment of the pixels may be variously changed in other embodiments.

Referring to FIG. 14, a first scan line E1-150 for transmitting a scan signal to pixels of the first unit area pixel E of the first pixel row is extended in the horizontal direction. A second scan line O2-150 for transmitting a scan signal to pixels of the second unit area pixel O of the second pixel row is extended in the horizontal direction. Then, the pixels of the first unit area pixel E of the first pixel row are selected in plural by the scan signal transmitted through the first scan line E1-150. In FIG. 14, the pixel E11 is selected. A pixel E22 of which a circuit unit is reverse (e.g., inverted) to a circuit unit of the pixel E11 in alignment, shares the first scan line E1-150 due to the reversed circuit unit (e.g., inverted circuit unit), and is selected by receiving the scan signal from the first scan line E1-150.

Here, since a plurality of pixels of the second unit area pixel O in the first pixel row have circuit units in reverse structure (e.g., inverted structure), they are selected by receiving a scan signal from a scan line (not shown) above (e.g., in an upper portion of) the first pixel row.

A plurality of pixels of the second unit area pixel O of the second pixel row are selected by a scan signal transmitted through a second scan line O2-150. In FIG. 14, a pixel O21 is selected. A pixel O32 of which a circuit unit alignment is reverse (e.g., inverted) to that of the pixel O21, shares the second scan line O2-150 due to the reversed circuit unit (e.g., inverted circuit unit), and is selected by receiving a scan signal from the second scan line O2-150.

Thus, pixels of the first unit area pixel E included in two pixel rows of the display panel are sequentially selected by the scan signals sequentially transmitted from the first scan line E1-150. Like the pixels of the first unit area pixel E, pixels of the second unit area pixel O included in two pixel rows of the display panel are sequentially selected by the scan signals sequentially transmitted from the second scan line O2-150.

Such an alignment structure of the scan lines according to the exemplary embodiment of the present invention can select pixels of each unit area vertically connected to one scan line so that complication of the design can be prevented or reduced and consequently, a decrease of an aperture ratio can be prevented or reduced.

The first scan line E1-150 is connected with data wires BDATA, GDATA, and RDATA of sub-pixels of pixels E11 and E12 and an image data signal is programmed through the connection. In addition, the second scan line O2-150 is connected with data wires BDATA, GDATA, and RDATA of sub-pixels of pixels O21 and O32 and an image data signal is programmed through the connection.

That is, for the scan period 4 during which the pixels of each unit area are sequentially selected through the scan line and receive the scan signal, an image data signal is programmed to the respective pixels of the sequentially selected unit area through the data wires connected to the scan line.

FIG. 14 illustrates a first power line VE1-ELVDD extended to the pixels E11 and E12 and for supplying the first power voltage to the pixels of the first unit area pixel E, and a first power line VO1-ELVDD extended to pixels O12, E22, and O32 and for supplying the first power voltage to the pixels of the second unit area pixel O.

When the first power voltage is supplied from the first power line VE1-ELVDD, the first power voltage is transmitted in the horizontal direction through a first horizontal power line HE1-ELVDD connected to pixels E11 and E22. For example, the first power voltage supplied from the first power line VE1-ELVDD is transmitted in the horizontal direction through a mesh contact point MCP1 provided in a part of the first horizontal power line HE1-ELVDD of the pixel E11. The mesh contact point MCP1 denotes a point where the first vertical power line extended in the vertical direction and arranged in the horizontal direction, and the first horizontal power line extended in the horizontal direction and arranged in the vertical direction, are connected with each other through a contact hole formed in an area where the two lines are overlapped with each other.

The first power voltage transmitted in the horizontal direction of the first horizontal power line HE1-ELVDD through the mesh contact point MCP1 is transmitted to a driving transistor of each sub-pixel of the pixels E11 and E22, and therefore the driving transistors of the respective sub-pixels of the pixels E11 and E23 can supply driving currents according to the image data signals to organic light emitting diodes respectively connected thereto according to voltage level variation of the first power voltage. Then, the organic light emitting diodes emit light corresponding to the driving currents for the emission period 4 during which the first power voltage experiences voltage level variation and maintained in the voltage level. For example, in case of a pixel formed of PMOS transistors as shown in FIG. 5A and FIG. 5B, a driving current according to a stored image data signal is supplied to organic light emitting diodes through driving transistors of the sub-pixels of pixels E11 and E22, and light is emitted for the emission period 4 during which the first power voltage is changed from low level to high level, and then maintained with the low level.

When the first power voltage is supplied from the first power line VO1-ELVDD using the above-stated method, the first power voltage is transmitted in the horizontal direction through the first horizontal power line HO2-ELVDD connected to the pixels O32 and O21. In particular, the first power voltage supplied from the first power line VO1-ELVDD is transmitted in the horizontal direction through a mesh contact point MCP2 provided in a part of the first horizontal power line HO2-ELVDD of the pixel O32. A level of the first power voltage transmitted at this point is changed during the light emission period 4 to supply a driving current to organic light emitting diodes of sub-pixels included in each pixel of the second unit area pixel O of the display, so that the organic light emitting diode can emit light.

As described, the design of the display device can be simplified by arranging the first power voltage to be transmitted to the first unit area pixels E or the second unit area pixels O disposed in two pixel lines, along the first power lines that are alternately disposed along the respective pixel lines. However, as shown in the signal timing diagram of FIG. 6, the first power voltage EVDD transmitted to the first unit area pixels E and the first power voltage OVDD transmitted to the second unit area pixels O are alternately maintained with a high level (e.g., a predetermined high level), and accordingly, the light emission period 4 of the first unit area pixels E and the light emission period 4 of the second unit area pixels O are not overlapped with each other.

Here, referring to FIG. 14, the vertical compensation line E1-GC for transmitting the compensation control signal to the pixels of the first unit area pixel E, included in the first pixel line, the vertical compensation line O1-GC for transmitting the compensation control signal to the pixels of the second unit area pixel O, included in the first and second pixel lines, and the vertical compensation line E2-GC for transmitting the compensation control signal to the pixels of the first unit area pixel E, included in the second and third pixel lines, are arranged in the horizontal direction.

Further, a horizontal compensation line that is connected with the vertical compensation lines by forming contact holes in areas overlapped with the vertical compensation lines is extended in the horizontal direction in each pixel.

In further detail, a horizontal compensation line E11-160 of the pixel E11, connected with the first vertical compensation line E1-GC through the contact hole, receives the compensation control signal and transmits the received signal to a compensation gate electrode of each sub-pixel of the pixel E11.

In a pixel unit of the pixel E22 having a structure that is vertically reversed (e.g., vertically inverted) to a structure of a circuit unit of the pixel E11, a horizontal compensation line E22-160 is connected with a third vertical compensation line E2-GC through the contact hole, receives the compensation control signal, and transmits the received signal to a compensation gate electrode of each sub-pixel of the pixel E22.

In addition, horizontal compensation lines O21-160 and O32-16 of a circuit unit of a pixel O21 and a circuit unit of a pixel O32 having a structure that is vertically reversed (e.g., vertically inverted) to a structure of the circuit unit of the pixel O21, are respectively connected with a second vertical compensation line O1-GC through the contact holes, receive the compensation control signals, and transmit the received signals to a compensation gate electrode of each sub-pixel of the pixels O21 and O32.

The compensation control signal diode-connects the drain electrode and the gate electrode of the driving transistor by turning on the compensation transistor during the compensation period 2 to compensate the driving transistor threshold voltage (e.g., compensate for the driving transistor threshold voltage variation).

Figure 15:
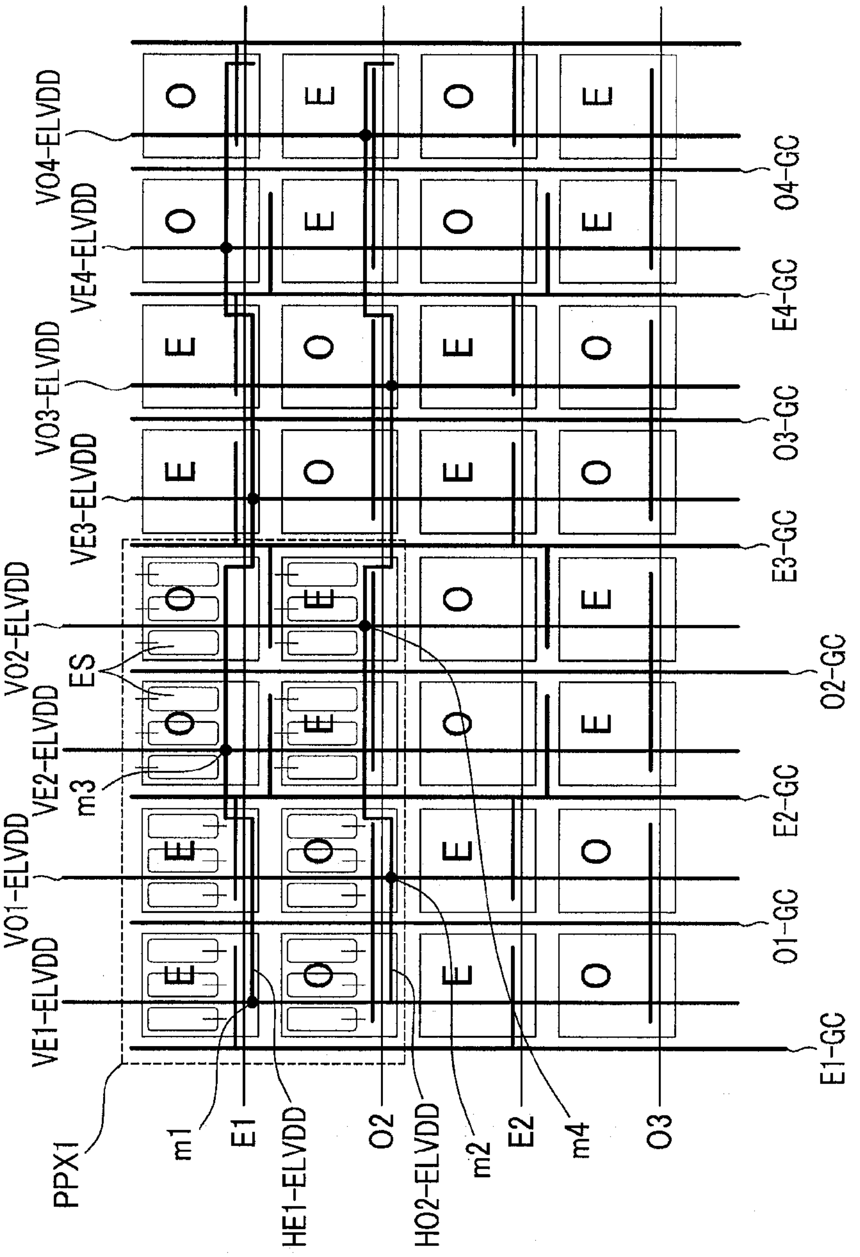
FIG. 15 schematically shows a 1×2 dot structure and alignment of various wires of the display panel of the OLED display device according to an exemplary embodiment of the present invention.

FIG. 15 schematically shows a 1×2 dot weave structure and an alignment of various wires of a display panel like the one shown in FIG. 3A. In a display panel having a 1×2 dot weave structure, power lines for supplying power voltages to first unit area pixels E or second unit area pixels O, compensation lines for supplying a compensation signal to the first unit area pixels E or the second unit area pixels O, and scan lines for supplying scan signals for selection of pixels of the first unit area pixel E, or the second unit area pixel O, may be arranged using the same method of the display panel having the 1×1 dot weave structure.

As shown in FIG. 15, in order to realize the 1×2 dot weave structure, a plurality of first vertical power lines V-ELVDD extended in a vertical direction are arranged in each pixel line along a horizontal direction. That is, in each pixel along a pixel row of pixels included in the first unit area pixel E or the second unit area pixel O, a first power line VE-EVLDD for supplying the first power voltage to the first unit area pixel E, and a first power line VO-ELVDD for supplying a third power voltage OVDD to the second unit area pixel O, are alternately arranged along the horizontal direction.

As shown in FIG. 15, a first power line VE1-ELVDD for supplying a voltage to the first unit area pixels E is arranged in a first pixel line, and a first power line VO1-ELVDD for supplying a voltage to the second unit area pixels O is arranged in the next pixel line. Then, power lines VE2-ELVDD, VO2-ELVDD, VE3-ELVDD, VO3-ELVDD, VE4-ELVDD, VO4-ELVDD, and so on are alternately arranged in the horizontal direction in each pixel line therefrom.

Here, according to a pixel row of the display panel, a first horizontal power line H-ELVDD for supplying the first power voltage EVDD supplied from the first vertical power line V-ELVDD and the third voltage OVDD to each sub-pixel of each pixel in the horizontal direction is formed. In further detail, a first horizontal power line HE-EVLDD for transmitting the first power voltage EVDD to the first unit area pixel E in the horizontal direction, and a first horizontal power line HO-ELVDD for transmitting the third voltage OVDD to the second unit area pixel O in the horizontal direction, are alternately arranged in the respective pixel rows.

Although it is not shown in FIG. 15, a first horizontal power line HO1-ELVDD for transmitting a voltage to the second unit area pixel O in the horizontal direction is arranged above (e.g., at an upper portion) of the first pixel row. Thus, emission units ES of the pixels of the second unit area pixel O included in the first pixel row receive a voltage from the first horizontal power line HO1-EVLDD (not shown).

Next, a first horizontal power line HE1-ELVDD for supplying a voltage to the pixels of the first unit area pixel E in the horizontal direction is arranged below (e.g., at a lower portion of) the first pixel row. A first power line HO2-ELVDD for supplying a voltage in the horizontal direction to the pixels of the second unit area pixel O is arranged below (e.g., at a lower portion of) the second pixel row. Although it is not shown in FIG. 15, the first horizontal power line HE-ELVDD for transmitting the voltage to the first unit area pixel E and the first horizontal power line HO-ELVDD for transmitting the voltage to the second unit area pixel O are alternately arranged according to the plurality of pixel rows.

As shown in FIG. 7 to FIG. 10, the first horizontal power lines H-ELVDD may be second storage capacitor electrodes 115, 115-1, and 115-2 connected between sub-pixels, furthermore, between pixels among the gate wires. Every two pixels in the horizontal direction have circuit units that are vertically reverse (e.g., vertically inverted) to each other. That is, since locations of the second storage capacitor electrodes 115,115-1, and 115-2 are vertically reversed (e.g., vertically inverted) in every two pixels, a supply direction of driving currents of every two pixels of the pixels supplied with the power voltage through the first horizontal power lines H-ELVDD is changed.

In further detail, in the structure of the display panel according to embodiments of the present invention, the power lines are arranged in the mesh structure, but the first unit area pixel E and the second unit area pixel O are electrically connected by forming contact holes in areas where the vertical power lines and the horizontal power lines are overlapped with each other in the pixels of the first unit area pixel E or the second unit area pixel O, and a driving current is supplied to each sub-pixel of the corresponding pixel for light emission.

For example, the pixel E11 of the first unit area pixel E arranged in the first pixel line of the first pixel row, and the pixel E12 of the first unit area pixel E arranged in the second pixel line of the first pixel row, receive the first power voltage EVDD from the first vertical power lines VE1-ELVDD and transmit the first power voltage ELVDD to each sub-pixel of the respective pixels in the horizontal direction through the second storage capacitor electrodes 115, 115-1, and 115-2, which constitute the first horizontal power line HE1-ELVDD. Due to the voltage at the point, the driving current flows upward so that the pixels E11 and E12 display an image during the emission periods 4 thereof.

This can be achieved by forming a contact hole m1 at a point where the first vertical power line VE1-ELVDD and the first horizontal power line HE1-ELVDD are overlapped with each other.

The first horizontal power line HE1-ELVDD extends in the horizontal direction, and the first power voltage EVDD is transmitted in the horizontal direction to each sub-pixel of a pixel E23 of the first unit area pixel E arranged in the third pixel line of the second pixel row and a pixel E24 of the first unit area pixel E arranged in the fourth pixel line of the second pixel row through a contact hole m2 formed at a point where the first horizontal power line HE1-ELVDD overlaps the second first vertical power line VE2-ELVDD. Due to the power voltage at this point, the driving current flows downward so that the pixels E23 and 24 display an image during light emission periods 4 thereof.

The power voltage is supplied in the horizontal direction through contact holes m3 and m4 respectively formed at points where a first horizontal power line HO2-ELVDD and two first vertical power lines VO1-ELVDD and VO2-ELVDD are respectively overlapped with each other, wherein directions of driving currents of every two pixels supplied with the power voltage are reversed in the vertical direction with respect to each other.

The contact holes m1, m2, m3, and m4 are called mesh contact points of power lines in the mesh structure. The mesh contact point is formed in every two pixels as shown in FIG. 15.

Here, circuit structures of every two pixels are vertically reversed (e.g., vertically inverted) in the 1×2 dot weave structure, and accordingly scan lines are alternately arranged according to pixel rows.

That is, although it is not illustrated in FIG. 15, the first scan line O1 (not shown) for transmitting the scan signal to the second unit area pixel O is formed above (e.g., at an upper portion of) the first pixel row.

The first scan line E for transmitting the scan signal to the first unit area pixel E is formed in a lower portion of the first pixel row.

Then, scan lines of the second unit area pixels O and scan lines of the first unit area pixels E are alternately arranged, like O2, E2, and O3, in the plurality of pixel rows.

Due to the vertically reversed (e.g. vertically inverted) alignment in every two pixels, the scan signal transmitted through the first scan line E1 sequentially select pixels of the first unit area pixel E included in the first pixel row and pixels of the first unit area pixel E included in the second pixel row and image data signals are programmed to the corresponding pixels during scan periods 3 thereof.

The scan lines of the first unit area pixels E and the scan lines of the second unit area pixels O alternately arranged through the above-stated method can select pixels of the corresponding unit area, included in every two pixel rows.

A plurality of vertical compensation lines GC extended in a vertical direction are arranged along the plurality of pixel lines. In further detail, a vertical compensation line E-GC for transmitting the compensation control signal to the first unit area pixel E, and a vertical compensation line O-GC for transmitting the compensation control signal to the second unit area pixel O, are alternately arranged in the horizontal direction along the pixel lines. The alignment of the vertical compensation lines in the 1×2 dot weave structure is substantially the same as the 1×1 dot weave structure. That is, as shown in FIG. 15, the vertical compensation line E1-GC of the first unit area pixel E may be arranged in the first pixel line and the vertical compensation line O1-GC of the second unit area pixel O may be arranged in the second pixel line. Then, vertical compensation lines may be alternately arranged, like E2-GC, O2-GC, E3-GC, O3-GC, E4-GC, and O4-GC according to the plurality of pixel lines therefrom.

Figure 16:
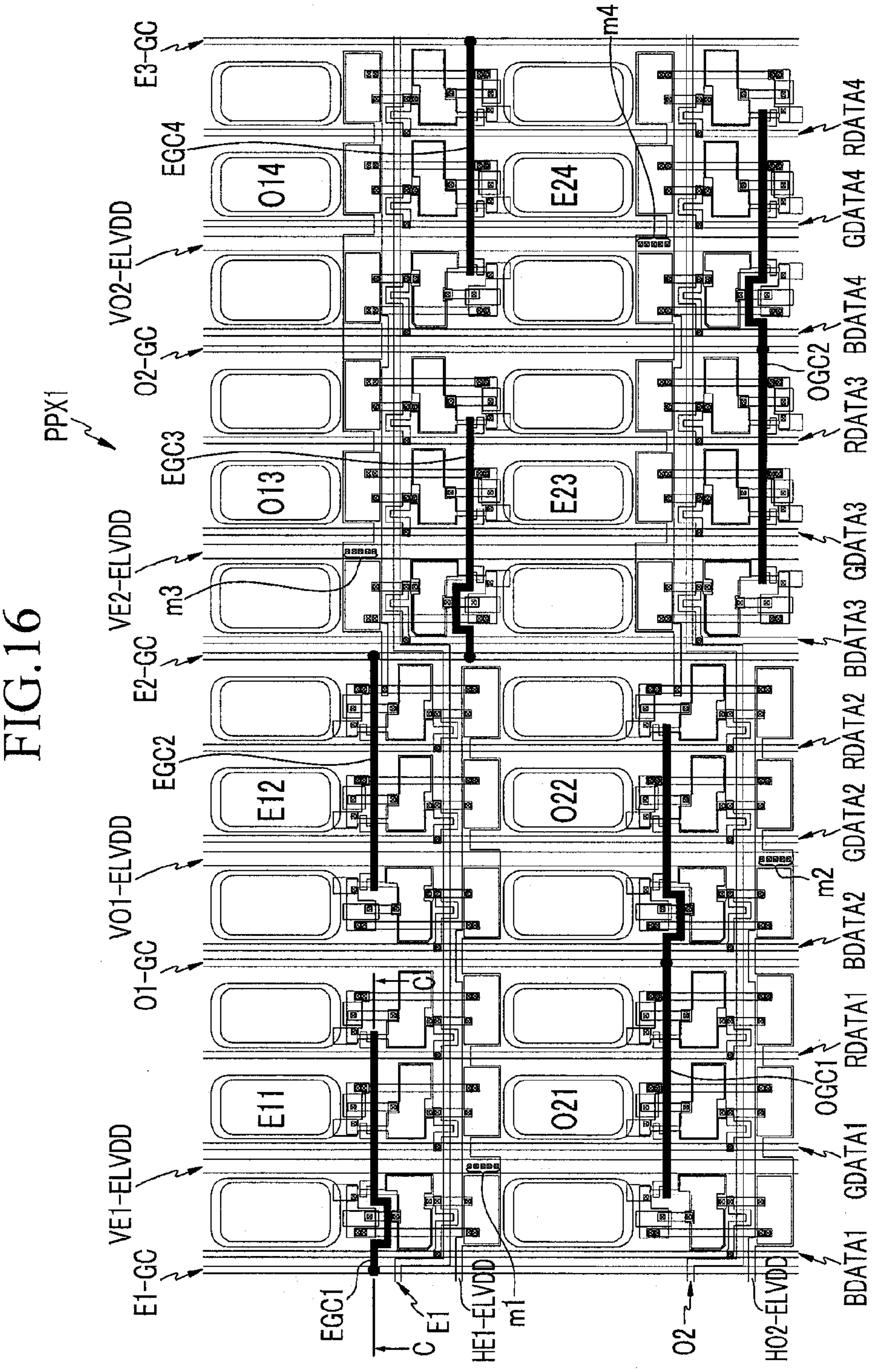
FIG. 16 is a layout view of a portion PPX1 of FIG. 15.

FIG. 16 illustrates a circuit diagram of 8 pixels of an area PPX1 defined by the first pixel line to the fourth pixel line of the first pixel row, and the first pixel line to the fourth pixel line of the second pixel row shown in FIG. 15 in detail.

In further detail, as shown in FIG. 16, the area PPX1 is formed of a pixel E11 of the first unit area corresponding to the first pixel line of the first pixel row, a pixel E12 of the first unit area corresponding to the second pixel line of the first pixel row, an emission unit of a pixel O13 of the second unit area corresponding to the third pixel line of the first pixel row, an emission unit of a pixel O14 of the second unit area corresponding to the second pixel line of the first pixel row, a pixel O21 of the second unit area corresponding to the first pixel line of the first pixel row, a pixel O21 of the second unit area corresponding to the first pixel line of the second pixel row, a pixel O22 of the second unit area corresponding to the second pixel line of the second pixel row, a pixel E23 of the first unit area corresponding to the third pixel line of the second pixel row, a pixel E24 of the first unit area corresponding to the fourth pixel line of the second pixel row, a circuit unit of a pixel O33 of the second unit area corresponding to the third pixel line of the third pixel row, and a circuit unit of a pixel O34 of the second unit area corresponding to the fourth pixel line of the third pixel row. Here, circuit units extended in the horizontal direction are vertically reversed (e.g., vertically inverted) in the respective pixels.

The detailed pixel circuit diagram of FIG. 16 is similar to that of FIG. 14, and therefore, no further description of the similar parts will be provided.

In FIG. 16, a pixel of each unit area is arranged as a pair in the area PPX1, and positions of circuit units and emission units of the corresponding pixels are vertically reversed (e.g., vertically inverted) when a pair of pixels of different unit areas are arranged.

Thus, the scan signal is alternately programmed to two pixel pairs of the same unit area arranged in two pixel rows from one scan line in the horizontal direction. That is, in FIG. 16, the pixel E11 of the first pixel row and the pixels E23 and E24 of the second pixel row share one first scan line E1 and receive scan signals therethrough such that image data signals can be supplied during the scan period 3. The pixels O21 and O22 of the second pixel row and pixels O33 and O34 of the third pixel row (not shown in FIG. 16) share one first scan line O2.

In addition, in the case of a horizontal power line connected to a vertical power line for supplying a first power voltage and for supplying the first power voltage to sub-pixels included in the respective pixels, the voltage is transmitted to a pair of pixels of the same unit area arranged in two pixel rows in the horizontal direction from one first horizontal power line. That is, in FIG. 16, the pixel E11 of the first pixel row and the pixels E23 and E24 of the second pixel row receive the power voltage in the horizontal direction from one first horizontal power line HE1-ELVDD, and an image is displayed during the light emission period 4 according to voltage level variation of the power voltage. In this case, the first horizontal power line HE1-ELVDD of the pixels E11 and E12 is connected with a first vertical power line VE1-ELVDD passing the pixel E11 through the contact hole m1. The first horizontal power line HE1-ELVDD of the pixels E23 and E24 is connected with a first vertical power line VE2-ELVDD passing the pixel E23 through the contact hole m3.

Through the same way described above, the pixels O21 and O22 of the second pixel row and the pixels O33 and O34 of the third pixel row (not shown in FIG. 16) receive the power voltage in the horizontal direction from one first horizontal power line HO2-ELVDD. In this case, the first horizontal power line HO2-LEVDD of the pixels O21 and O22 is connected with the first vertical power line VO1-LEVDD passing the pixel O22 through the contact hole m2. In addition, the first horizontal power line HE1-ELVDD of the pixels O33 and O34 is connected with a first vertical power line VO2-ELVDD passing the pixel O34 through the contact hole m3.

Here, alignment and connection of compensation lines of the 1×2 dot structure in FIG. 15 are substantially the same as those of the 1×1 dot structure in FIG. 14. That is, the pixel E11 receives a compensation control signal through a horizontal compensation line EGC1 connected to a vertical compensation line E1-GC. The pixel E12 and the pixel E23 respectively share a vertical compensation line E2-GC and receive the compensation control signals through horizontal compensation lines EGC2 and EGC3 connected to the vertical compensation line E2-GC. The pixel E24 receives the compensation control signal through a horizontal compensation line EGC4 connected to a vertical compensation line E3-GC.

In addition, the pixel O21 and the pixel O22 respectively have a horizontal compensation line OGC1 connected by sharing a vertical compensation line O1-GC, and the pixel O33 and the pixel O34 (not shown in FIG. 16) of the third pixel row respectively have a horizontal compensation line OGC2 connected by sharing a vertical compensation line O2-GC.

With such a mesh method, the vertical and horizontal power lines and the vertical and horizontal compensation lines are connected with each other through contact holes, and each pixel of each unit area receives a power voltage or a compensation control signal so that a design of the pixel alignment can be prevented from being complicated.

Figure 17:
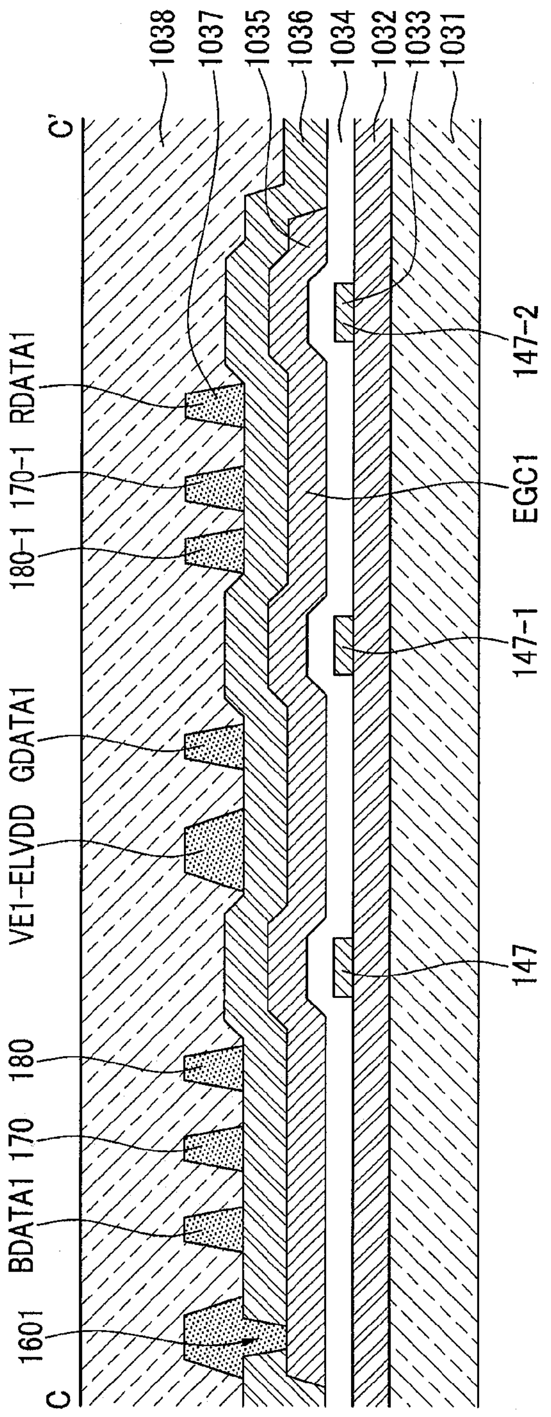
FIG. 17 is a cross-sectional view of FIG. 16, taken along the line C-C'.

FIG. 17 shows a cross-sectional view of FIG. 15, taken along the line C-C', that is, a cross-sectional view corresponding to an alignment area of the horizontal compensation line EGC1 that transmits the compensation control signal supplied from the vertical compensation line E1-GC to the respective sub-pixels of the pixel E11.

FIG. 17 shows a process for arranging the display panel of FIG. 15 and constituent elements of the display panel.

First, a buffer layer 1032 made of silicon oxide is formed on an insulation substrate 1031 and a semiconductor layer pattern 1033 is formed on the buffer layer 1032. In embodiments according to the present invention, the semiconductor layer pattern 1033 is a polysilicon layer and forms an active layer of the transistor.

A gate insulating layer 1034 is formed on the semiconductor layer pattern 1033 and a gate wire 1035 formed of a metal layer is formed by being patterned on the gate insulating layer 1034. FIG. 17 is a cross-section taken along the line C-C' and accordingly the gate wire 1035 indicates a horizontal compensation line EGC1.

After the gate wire 1035 is patterned and then doped with an impurity using the gate wire 135 as a doping prevention layer, a doped portion forms a source electrode or a drain electrode of the transistor. However, since the portion C-C' is the horizontal compensation line EGC1 horizontally extended over the respective sub-pixels included in the pixel, the semiconductor pattern 133 layered below (e.g., at a lower portion of) the horizontal compensation line EGC1 is not doped with the impurity due to the horizontal compensation line EGC1 and forms a channel. That is, the semiconductor layer pattern 1033 becomes compensation active layers 147, 147-1, and 147-2 of compensation transistors included in the respective sub-pixels and the gate wire 1035 corresponding to an upper portion of each of the compensation active layers 147, 147-1, and 147-2 becomes a compensation gate electrode.

Next, an interlayer insulating layer 135 is formed on the gate wire 1035. An electrode wire 137 is patterned and disposed on the interlayer insulating layer 1036.

The electrode wire 1037 corresponding to the line C-C' is provided to each of three sub-pixels B, G, and R from the left side. In further detail, the electrode wire 1037 of the portion C is a vertical compensation line E1-GC. In addition, the electrode wire 1037 includes a data wire BDATA1 for supplying an image data signal corresponding to the sub-pixel B, a second power line 170 for transmitting the first power voltage as a node where the storage capacitor and the source electrode of the driving transistor are connected, and a first connection wire 180 that is a node where the compensation capacitor and the gate electrode of the driving transistor are respectively arranged in the sub-pixel B. Further, the electrode wire 1037 provided between the sub-pixel B and the sub-pixel G, is a first vertical power line VE1-ELVDD for supplying the first power voltage. In the sub-pixel G, a data wire GDATA1 for supplying an image data signal corresponding to the sub-pixel G, a first connection wire 180-1, that is, a node where the compensation capacitor and the gate electrode of the driving transistor are connected, and a second power line 170-2 for transmitting the first power voltage as a node where the storage capacitor and the source electrode of the driving transistor are connected.

Then, the next electrode wire 1037 becomes a data wire RDATA1 for supplying an image data signal to the sub-pixel R in the sub-pixel R. In addition, the portion C' corresponds to the compensation gate electrode of the compensation transistor, and therefore, although it is not illustrated, the electrode wire 1037 is arranged in the other area of the sub-pixel R. That is, although it is not illustrated in FIG. 17, there exists a first connection wire 180-2 that is a node where the compensation capacitor and the gate electrode of the driving transistor are connected and a second power line 170-2 for transmitting the first power voltage as a node where the storage capacitor and the driving transistor are formed in the sub-pixel R.

In particular, among the electrode wires 1037 shown in FIG. 17, the vertical compensation line E1-GC forms a contact hole 1601 so as to be connected to the horizontal compensation line EGC1 when formed by being patterned on the interlayer insulating layer 1036. A compensation control signal supplied from the vertical compensation line E1-GC through the contact hole 1601 is transmitted to the gate electrode of the compensation transistor of each sub-pixel through the horizontal compensation line EGC1.

A pixel defining layer 1038 is formed on the finally patterned electrode wire 1037 and the interlayer insulating layer 1036.

Figure 18:
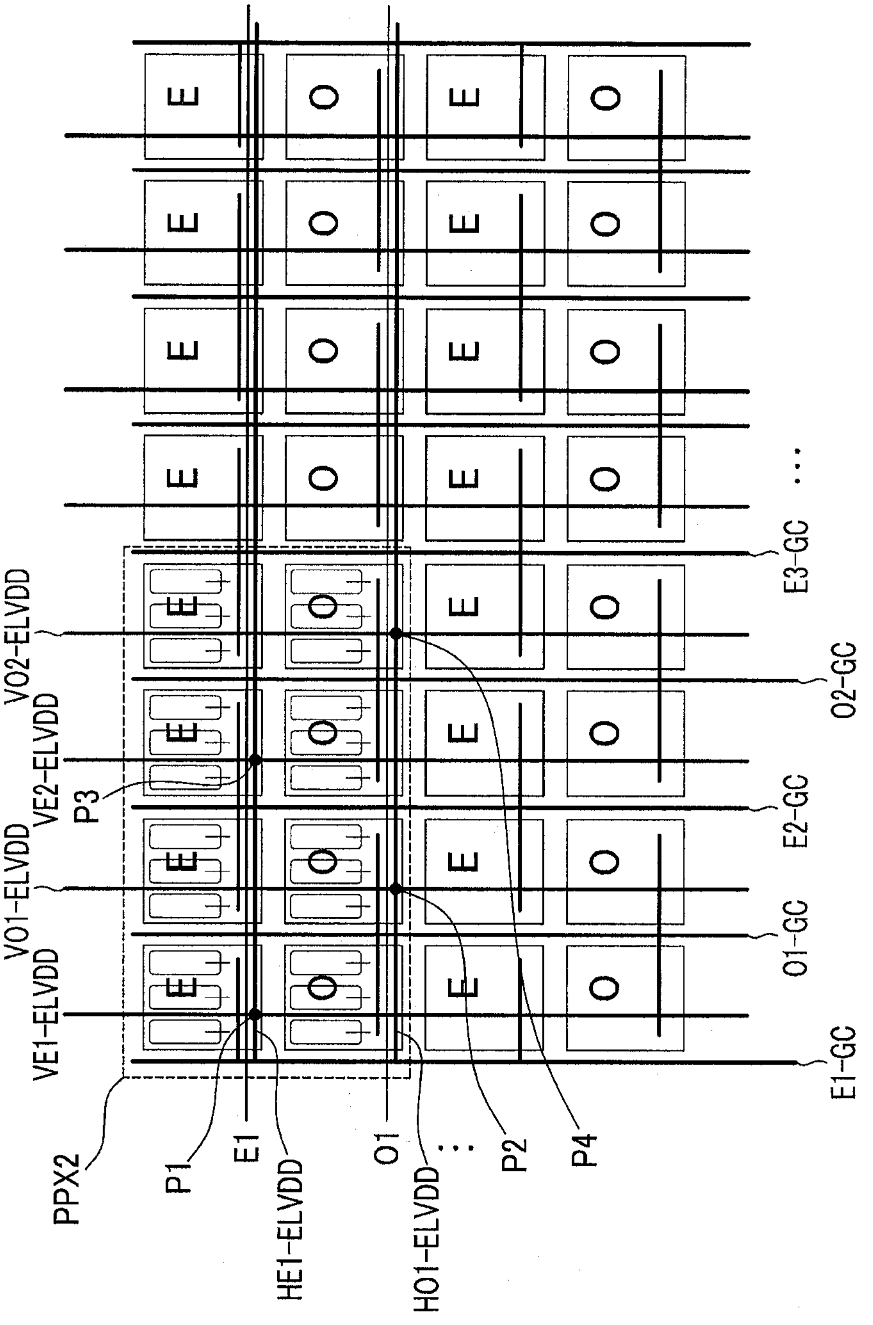
FIG. 18 schematically shows a line-by-line structure and alignment of various wires of the display panel of the OLED display device according to an exemplary embodiment of the present invention.

FIG. 18 schematically shows a line-by-line structure and a layout of various wires of the display panel of the display device according to an exemplary embodiment of the present invention.

As shown in FIG. 18, when the pixel layout of the display panel is a line by line structure, a layout of a power line for supplying a power voltage to the first unit area pixel E or the second unit area pixel O, a compensation line for supplying a compensation control signal to the first unit area pixel E or the second unit area pixel O, and a scan line for supplying a scan signal for selection of pixels of the first unit area pixel E or the second unit area pixel O, are not greatly different from those of FIG. 13 and FIG. 15, and therefore no further description of the similar layout will be provided.

However, in the display panel according to the exemplary embodiment of FIG. 18, pixels of the first unit area pixel E form one pixel row, pixels of the second unit area pixel O form one pixel row, and the two rows are alternately arranged, and accordingly locations of circuit units and emission units of adjacent pixels are not vertically reversed (e.g., not vertically inverted). Thus, similar to a scan line E1 for transmitting a scan signal to pixels of the first unit area pixel E, included in the first pixel row, and a scan line O1 for transmitting a scan signal to pixels of the second unit area pixel O, included in the second pixel row, when scan lines corresponding to the first unit area pixel E and scan lines corresponding to the second unit area pixel R are sequentially arranged according to pixel rows, they may be arranged as straight lines due to circuit units of horizontally adjacent pixels.

First horizontal power lines H-ELVDD for transmitting the first power voltage EVDD, and the third power voltage OVDD supplied from the first vertical power line V-ELVDD to sub-pixels of the respective pixels, are also alternately arranged in the pixel rows, and in this case, the first horizontal power lines H-ELVDD may be arranged as straight lines due to circuit units of the horizontally connected pixels.

A difference from the line by line structure will be described in further detail using a pixel layout view of the display panel of FIG. 19. In particular, FIG. 19 is a layout view of 8 pixels in an area PPX2 of FIG. 18.

Figure 19:
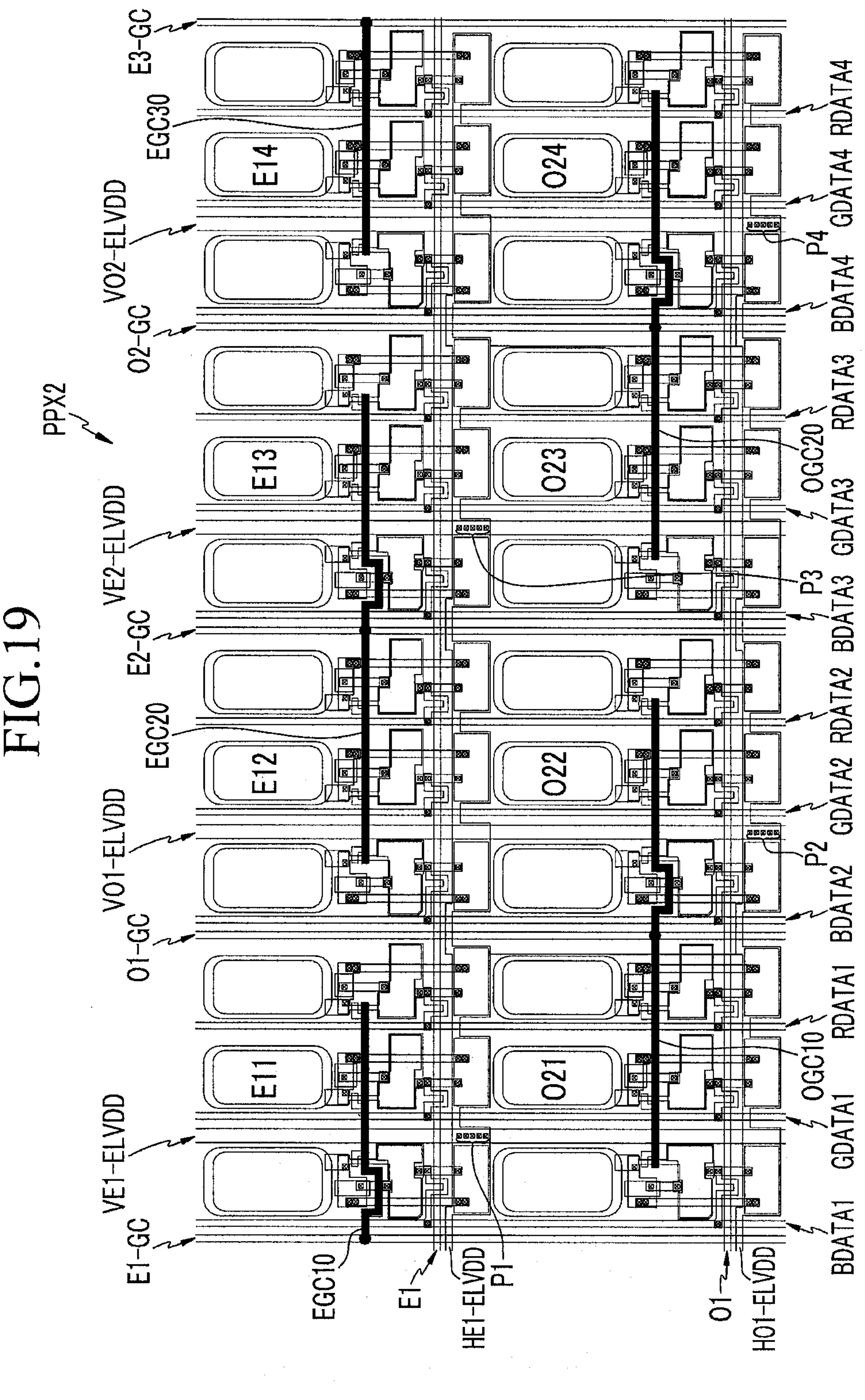
FIG. 19 is a layout view of a portion PPX2 of FIG. 18.

Unlike FIG. 14 and FIG. 16, alignment of emission units and circuit units of the pixels of FIG. 19 are not vertically reversed (e.g., not vertically inverted). That is, the area PPX2 of FIG. 18 is formed of a pixel E12 of the first unit area corresponding to the second pixel line of the first pixel row, a pixel E13 of the first unit area corresponding to the third pixel line of the first pixel row, a pixel E13 of the first unit area corresponding to the third pixel line of the first pixel row, a pixel E14 of the first unit area corresponding to the fourth pixel line of the first pixel row, a pixel O21 of the second unit area corresponding to the first pixel line of the second pixel row, a pixel O22 of the second unit area corresponding to the first pixel line of the second pixel row, a pixel O22 of the second unit area corresponding to the second pixel line of the second pixel row, a pixel O23 of the second unit area corresponding to the third pixel line of the second pixel row, and a pixel O24 of the second unit area corresponding to the fourth pixel line of the second pixel row.

As shown in FIG. 19, the pixels are arranged in parallel in sequence of an emission unit and a circuit unit, and accordingly the scan line E1 connected to the pixels of the first unit area of the first pixel row and the scan line O1 connected to pixels of the second unit area of the second pixel row may be realized as straight metal wires. Thus, switching transistors of sub-pixels of the pixels respectively connected to the scan lines receive the scan signal during the scan period and the corresponding image data signal, so that an emission unit disposed above (e.g., at an upper portion of the circuit unit of) each of the sub-pixels where the scan line is arranged, emits light during the light emission period 4.

For light emission of the emission units of the respective sub-pixels with a driving current according to the image data signal to occur, a voltage level of the first power voltage supplied to each sub-pixel should be changed. Horizontal power lines that receive the first power voltage from the first vertical power line V-ELVDD and supply the first power voltage to the pixels arranged in the horizontal direction, are also wired in the straight line shape.

That is, the pixels E11, E12, E13, and E14 forming the first pixel row are connected through a first horizontal power line HE1-ELVDD. The first horizontal power line HE1-ELVDD is a second storage capacitor electrode of each sub-pixel, and a plurality of second storage capacitor electrodes are connected with each other. The pixels O21, O22, O23, and O24 of the second pixel row are also connected through a first horizontal power line HO1-ELVDD.

In this case, the first horizontal power line HE1-ELVDD is connected with the first vertical power line VE1-ELVDD passing the pixel E11 and the first vertical power line VE2-ELVDD passing the pixel E13 to receive a voltage therefrom through contact holes P1 and P3, respectively. In addition, the first horizontal power line HO1-ELVDD is connected with the first vertical power line VO1-ELVDD passing the pixel O22 and the first vertical power line VO2-ELVDD passing the pixel O24 to receive the voltage therefrom through contact holes P2 and P4, respectively.

In FIG. 19, structures of other pixels and alignment of compensation lines are substantially the same as those of the previously described exemplary embodiments, and therefore no further description will be provided.

As described, each pixel of the display panel is variously arranged for each unit area, and connection wires are arranged not to be overlapped with each other for each unit area through the mesh structure of the vertical and horizontal power lines and the mesh structure of the vertical and horizontal compensation lines, thereby avoiding complication of a design.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Further, the materials of the components described in the specification may be selectively substituted by various known materials by those skilled in the art. In addition, some of the components described in the specification may be omitted without the deterioration of the performance or may be added in order to improve the performance by those skilled in the art. Moreover, the sequence of the steps of the method described in the specification may be changed depending on a process environment or equipments by those skilled in the art. Accordingly, the scope of the present invention should be determined not by the above-mentioned exemplary embodiments, but by the appended claims and the equivalents thereof.

DESCRIPTION OF SOME OF THE REFERENCE NUMERALS

| | |
|---|---|
| 110: first storage capacitor electrode | |
| 115: second storage capacitor electrode | |
| 120: switching transistor semiconductor layer | |
| 121: switching drain electrode | |
| 122: switching source electrode | |
| 123: switching active layer | |
| 130: first compensation capacitor electrode | |
| 135: second compensation capacitor electrode | |
| 140: driving transistor semiconductor layer | |
| 141: driving drain electrode | |
| 142: driving active layer | 143: driving source electrode |
| 145: compensation transistor semiconductor layer | |
| 146: first compensation electrode | |
| 147: compensation active layer | |
| 148: second compensation electrode | |
| 150: scan line | 160: horizontal compensation line |
| 170: second power line | 180: first connection wire |
| 185: second connection wire | 190: organic emission layer |
| 195: first electrode of OLED | |

What is claimed is:

1. An organic light emitting diode (OLED) display device comprising:

a plurality of pixels comprising first group pixels configured to concurrently emit light during a first field, and second group pixels configured to concurrently emit light during a second field that is different from the first field, the first group pixels and the second group pixels being arranged in a plurality of rows, each of the rows comprising some of the first group pixels and some of the second group pixels;

a plurality of first scan lines directly coupled to the first group pixels;

a plurality of second scan lines directly coupled to the second group pixels; and a plurality of first power lines for supplying a first power voltage to each of the first group pixels and a plurality of second power lines for supplying a second power voltage to each of the second group pixels, wherein the plurality of first power lines and the plurality of second power lines are coupled with first electrodes of respective storage capacitors of the first group pixels and the second group pixels, wherein the first power voltage is supplied as a first level voltage for a first period during which the first group pixels concurrently emit light, wherein the second power voltage is supplied as a second level voltage for a second period that is different from the first period during which the second group pixels concurrently emit light, wherein the first scan lines are different from the second scan lines, and wherein the first group pixels are different from the second group pixels.

2. The OLED display device of claim 1, wherein the first level voltage and the second level voltage have the same level.

3. The OLED display device of claim 1, wherein the first level voltage and the second level voltage are different from a level of the first power voltage and a level of the second power voltage for a scan period during which a plurality of scan signals are transmitted through the plurality of first scan lines and the plurality of second scan lines.

4. The OLED display device of claim 1, wherein an extension direction of the plurality of first and second power lines, and a connection direction of the first electrodes of the storage capacitors, are perpendicular to each other.

5. The OLED display device of claim 1, wherein the plurality of first power lines and the plurality of second power lines are alternately arranged in a row direction or a column direction of the plurality of pixels.

6. The OLED display device of claim 1, wherein the respective first group pixels and the respective second group pixels comprise at least one power connection wire coupled to the first electrodes of the storage capacitors and configured to respectively transmit the first power voltage and the second power voltage supplied to the first electrodes of the storage capacitors.

7. The OLED display device of claim 1, wherein the respective first group pixels and the respective second group pixels comprise at least one data line crossing the plurality of first scan lines and the plurality of second scan lines and being configured to transmit image data signals to the respective first group pixels and the respective second group pixels.

8. The OLED display device of claim 7, wherein, as a stereoscopic image data signal, the image data signal is a left-eye image data signal or a right-eye image data signal.

9. The OLED display device of claim 7, wherein the at least one data line comprises data lines that are respectively spaced from and are parallel to the plurality of first power lines and the plurality of second power lines.

10. The OLED display device of claim 1, wherein the plurality of first scan lines and the plurality of second scan lines are alternately arranged in a row direction or a column direction of the plurality of pixels.

11. The OLED display device of claim 1, further comprising:

a plurality of first compensation lines and a plurality of second compensation lines for respectively transmitting a first compensation control signal and a second compensation control signal that control operation performed for compensating threshold voltage of a driving transistor of each of the first and second group pixels; and a plurality of first compensation control connection lines and a plurality of second compensation control connection fines coupled to the respective first and second group pixels and for transmitting the first compensation control signal and the second compensation control signal transmitted through the plurality of first compensation lines and the plurality of second compensation lines to the first group pixels and the second group pixels.

12. The OLED display device of claim 11, wherein a period for compensating the threshold voltage of the driving transistor is prior to a scan period during which a plurality of scan signals are transmitted through the plurality of first scan lines and the plurality of second scan lines of the OLED display device.

13. The OLED display device of claim 11, wherein the plurality of first compensation lines and the plurality of second compensation lines are respectively spaced from and are in parallel to the plurality of first power lines and the plurality of second power lines of the OLED display device.

14. The OLED display device of claim 11, wherein the plurality of first compensation lines and the plurality of second compensation lines respectively cross the plurality of first scan lines and the plurality of second scan lines of the OLED display device.

15. The OLED display device of claim 11, wherein a direction in which the plurality of first compensation lines and the plurality of second compensation lines extend, and a direction in which the plurality of first compensation control connection lines and the plurality of second compensation control lines extend, are perpendicular to each other.

16. The OLED display device of claim 11, wherein the plurality of first compensation lines and the plurality of second compensation lines are alternately arranged in a row direction or a column direction of the plurality of pixels.

17. The OLED display device of claim 1, wherein each of the first group pixels and each of the second group pixels respectively comprise at least one sub-pixel including an emission unit comprising an organic light emitting diode and a circuit unit for supplying a driving current according to an image data signal to the emission unit.

18. The OLED display device of claim 17, wherein the at least one sub-pixel comprises one or more of sub-pixels R, G, and B.

19. The OLED display device of claim 17, wherein the first electrodes of the storage capacitors of the respective sub pixels are coupled with each other.

20. The OLED display device of claim 17, wherein the emission unit is formed at a layer different from a layer where the circuit unit is formed.

21. The OLED display device of claim 17, wherein the emission unit comprises a first electrode layer coupled with the circuit unit, an organic emission layer, and a second electrode layer to which a third power voltage is applied.

22. The OLED display device of claim 21, wherein the third power voltage is a third level voltage for a third period that is prior to a scan period during which a plurality of scan signals are transmitted through the plurality of first scan lines and the plurality of second scan lines.

23. The OLED display device of claim 22, wherein the third level voltage is higher than a first power voltage level and a second power voltage level respectively supplied to the first group pixels and the second group pixels during the third period.

24. The OLED display device of claim 17, wherein the circuit unit comprises:

a driving transistor comprising a driving drain electrode coupled with a first electrode layer of the emission unit, a driving gate electrode, a driving active layer, and a driving source electrode;

a switching transistor comprising a switching gate electrode, a switching active layer, a switching source electrode, and a switching drain electrode;

a compensation transistor comprising a compensation gate electrode, a compensation active layer, a first compensation electrode, and a second compensation electrode;

a storage capacitor comprising a first electrode from among the first electrodes and a second electrode; and a compensation capacitor comprising a first compensation capacitor electrode and a second compensation capacitor electrode.

25. The OLED display device of claim 24, wherein the first electrode of the storage capacitor is coupled through at least one contact hole to a point crossed with the first power line or the second power line, and the first electrode of the storage capacitor is coupled through at least one contact hole to a point overlapped with at least one power connection wire that transmits the first power voltage or the second power voltage supplied through the first power line or the second power line to the driving source electrode.

26. The OLED display device of claim 24, wherein the switching gate electrode is coupled to a first scan line from among the first scan lines or a second scan line from among the second scan lines, the switching source electrode is coupled to a data line for transmitting an image data signal, and the compensation gate electrode is coupled with a first compensation control connection line or a second compensation control connection line.

27. The OLED display device of claim 24, wherein the circuit unit further comprises:

a power connection wire coupling the first electrode of the storage capacitor to the driving source electrode and for transmitting the first power voltage or the second power voltage transmitted to the first electrode of the storage capacitor to the driving source electrode;

a first connection wire coupling the second electrode of the storage capacitor, the switching drain electrode, and the first compensation capacitor electrode; and a second connection wire coupling the second compensation capacitor electrode and the driving gate electrode.

28. The OLED display device of claim 24, wherein the circuit unit further comprises a connection portion coupling the first electrode layer of the emission unit and the driving drain electrode, and the first compensation electrode is coupled to the connection portion.

29. The OLED display device of claim 24, wherein the switching active layer, the switching source electrode, the switching drain electrode, the driving active layer, the driving source electrode, the driving drain electrode, the compensation active layer, the first compensation electrode, the second compensation electrode, the second electrode of the storage capacitor, and the first compensation capacitor electrode are located at a first layer.

30. The OLED display device of claim 24, wherein the switching gate electrode, the driving gate electrode, the compensation gate electrode, the first electrode of the storage capacitor, and the second compensation capacitor electrode are located at a same layer, and are respectively disposed on the switching active layer, the driving active layer, the compensation active layer, the second electrode of the storage capacitor, and the first compensation capacitor electrode, with an insulating layer interposed therebetween.

31. The OLED display device of claim 30, wherein a first scan line from among the first scan lines or a second scan line from among the second scan lines that is coupled to the switching gate electrode is located at a second layer, and is spaced from and between the first electrode of the storage capacitor and the second compensation capacitor electrode.

32. The OLED display device of claim 30, wherein a first compensation control connection line from among the first compensation control connection lines or a second compensation control connection line from among the second compensation control connection lines that is coupled to the compensation gate electrode is located at a second layer, and is spaced from and between the driving gate electrode and the second compensation capacitor electrode.

33. The OLED display device of claim 30, further comprising: a third layer on a second layer with an insulating layer interposed therebetween, the third layer comprising:

a data line for transmitting an image data signal;

a first power line or a second power line for supplying the first power voltage or the second power voltage;

a first compensation line or a second compensation line for transmitting a first compensation control signal or a second compensation control signal;

a power connection wire for transmitting the first power voltage or the second power voltage;

a first connection wire coupling the second electrode of the storage capacitor, the switching drain electrode, and the first compensation capacitor electrode; and a second connection wire coupling the second compensation capacitor electrode and the driving gate electrode.

34. The OLED display device of claim 33, wherein the data line has a contact hole in an area overlapped with the switching source electrode, the first power line or the second power line has a contact hole in an area overlapped with the first electrode of the storage capacitor, the first compensation line or the second compensation line has a contact hole in an area overlapped with a first compensation control connection line or a second compensation control connection line, the power connection wire has contact holes in areas respectively overlapped with the first electrode of the storage capacitor and the driving source electrode, the first connection wire has contact holes at areas respectively overlapped with the second electrode of the storage capacitor, the switching drain electrode, and the first compensation capacitor electrode, and the second connection wire has contact holes at areas respectively overlapped with the second compensation capacitor electrode and the driving gate electrode.

35. The OLED display device of claim 1, wherein the first group pixels form a plurality of first pixel rows arranged in a first direction, the second group pixels form a plurality of second pixel rows arranged in the first direction, and the first pixel rows and the second pixel rows are alternately arranged.

36. The OLED display device of claim 1, wherein each of the first group pixels and each of the second group pixels are alternately arranged in a first direction and a second direction that is perpendicular to the first direction.

37. The OLED display device of claim 36, wherein, in the first group pixels and the second group pixels that are alternately arranged in the first direction and adjacent to each other, a circuit unit is located at a first side or a second side opposite the first side of an emission unit in accordance with a location of the emission unit of each of the pixels.

38. The OLED display device of claim 36, wherein every two pixel rows of the first group pixels and the second group pixels alternately arranged in the first direction share one of the first scan lines or one of the second scan lines.

39. The OLED display device of claim 36, wherein every two pixel columns of the first group pixels and the second group pixels alternately arranged in the first direction share one of a plurality of first compensation lines or one of a plurality of second compensation lines.

40. The OLED display device of claim 1, wherein the first group pixels form a plurality of first pixel areas arranged in a first direction and a second direction that is perpendicular to the first direction with at least two pixels, the second group pixels form a plurality of second pixel areas arranged in the first and second directions with at least two pixels, and the first pixel areas and the second pixel areas are alternately arranged.

41. The OLED display device of claim 40, wherein, in the first pixel areas and the second pixel areas that are alternately arranged in the first direction and adjacent to each other, a circuit unit is located at a first side or a second side opposite the first side of an emission unit in each pixel area in accordance with a location of the emission unit.

42. The OLED display device of claim 40, wherein every two pixel rows of the first pixel areas and the second pixel areas that are alternately arranged in the first direction share at least one of the first scan lines or at least one of the second scan lines.

43. The OLED display device of claim 40, wherein every two pixel columns of the first pixels areas and the second pixel areas that are alternately arranged in the first direction share at least one of a plurality of first compensation lines or at least one of a plurality of second compensation lines.

44. An organic light emitting diode (OLED) display device comprising:

a plurality of pixels comprising first group pixels configured to concurrently emit light during a first field, and second group pixels configured to concurrently emit light during a second field that is different from the first field;

a plurality of first scan lines and a plurality of second scan lines respectively coupled to the first group pixels and the second group pixels;

a plurality of first compensation lines and a plurality of second compensation lines for respectively transmitting a first compensation control signal and a second compensation control signal that control operation of a compensating threshold voltage of a driving transistor of each of the first and second group pixels;

a plurality of first compensation control connection lines and a plurality of second compensation control connection lines respectively coupled to the plurality of first compensation lines and the plurality of second compensation lines and for respectively transmitting the first compensation control signal and the second compensation control signal to the first group pixels and the second group pixels; and a plurality of first power lines for supplying a first power voltage to respective ones of the first group pixels and a plurality of second power lines for supplying a second power voltage to respective ones of the second group pixels, wherein the first power voltage is supplied as a first level voltage for a first period during which the first group pixels concurrently emit light, and wherein the second power voltage is supplied as a second level voltage for a second period during which the second group pixels concurrently emit light, the second period being different from the first period, and the first power voltage and the second power voltage have a fourth level that is different from the first and second levels for fourth and fifth periods during which the threshold voltage of the driving transistor is compensated according to the first compensation control signal and the second compensation control signal, each of the fourth and fifth periods being prior to each of the first period and the second period.

45. The OLED display device of claim 44, wherein the fourth level is lower than the first and second levels.

46. The OLED display device of claim 44, wherein the plurality of first power lines and the plurality of second power lines are coupled with first electrodes of storage capacitors of the plurality of first and second group pixels.

47. The OLED display device of claim 44, wherein the first level voltage and the second level voltage have the same level.

48. The OLED display device of claim 44, wherein the first level voltage and the second level voltage are different from a voltage of the first power voltage and a voltage of the second power voltage for a scan period during which a plurality of scan signals are transmitted through the plurality of first scan lines and the plurality of second scan lines.

49. The OLED display device of claim 44, wherein the first compensation control signal and the second compensation control signal have a voltage level that turns on transistors of the plurality of pixels during the fourth and fifth periods.

50. The OLED display device of claim 44, wherein all scan signals transmitted through the plurality of first and second scan lines during the fourth and fifth periods have a voltage level that turns on transistors of the plurality of pixels.

51. The OLED display device of claim 44, wherein the first period is overlapped with a scan period of the second group pixels during which scan signals are sequentially transmitted to the second group pixels through the second scan lines, and the second period is overlapped with a scan period of the first group pixels during which the scan signals are sequentially transmitted to the first group pixels through the first scan lines.

52. The OLED display device of claim 44, wherein a third power voltage supplied to a second electrode layer of each emission unit of the first group pixels or the second group pixels has a fifth level during a sixth period prior to the fourth period or the fifth period.

53. The OLED display device of claim 52, wherein the fifth level voltage is higher than the levels of the first and second power voltages respectively supplied to the first group pixels and the second group pixels during the sixth period.

* * * * *